(12) United States Patent
Yamagishi

(10) Patent No.: US 10,679,339 B2
(45) Date of Patent: Jun. 9, 2020

(54) IMAGE REGISTRATION DEVICE, IMAGE REGISTRATION METHOD, IMAGE REGISTRATION SYSTEM, AND IMAGING TERMINAL

(71) Applicant: FUJIFILM Corporation, Tokyo (JP)

(72) Inventor: Hideki Yamagishi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 176 days.

(21) Appl. No.: 15/911,378

(22) Filed: Mar. 5, 2018

(65) Prior Publication Data

US 2018/0189941 A1 Jul. 5, 2018

Related U.S. Application Data

(63) Continuation of application No. PCT/JP2016/076731, filed on Sep. 12, 2016.

(30) Foreign Application Priority Data

Sep. 30, 2015 (JP) ................................. 2015-193483

(51) Int. Cl.
*G06T 7/00* (2017.01)
*G06F 16/58* (2019.01)
(Continued)

(52) U.S. Cl.
CPC .............. *G06T 7/001* (2013.01); *G01N 21/88* (2013.01); *G06F 16/58* (2019.01); *G06T 3/0068* (2013.01);
(Continued)

(58) Field of Classification Search
CPC ......... G06T 7/001; G06T 7/32; G06T 3/0068; G06T 2207/30168; G06T 2207/30184; G06F 16/58; G01N 21/88
See application file for complete search history.

(56) References Cited

U.S. PATENT DOCUMENTS

2003/0002580 A1* 1/2003 Miura .................. G06T 1/0007
375/240.02
2003/0065807 A1 4/2003 Satomi et al.
(Continued)

FOREIGN PATENT DOCUMENTS

JP 2003-022435 A 1/2003
JP 2003-111008 A 4/2003
(Continued)

OTHER PUBLICATIONS

Google Scholar Search Results.*
(Continued)

*Primary Examiner* — Qun Shen
(74) *Attorney, Agent, or Firm* — Studebaker & Brackett PC

(57) ABSTRACT

An image registration device includes an acquisition unit that acquires a captured image and an imaging position of the captured image from an imaging terminal, an inspection target specifying unit that specifies the inspection target that is an imaging target of the imaging terminal on the basis of the imaging position acquired by the acquisition unit, a first evaluation unit that evaluates whether or not the captured image acquired by the acquisition unit satisfies a predetermined reference for an image that is used for management of the inspection target, and a registration unit that registers the captured image evaluated as satisfying the reference by the first evaluation unit in the database in association with information indicating the inspection target specified by the inspection target specifying unit.

20 Claims, 14 Drawing Sheets

(51) Int. Cl.
*G01N 21/88* (2006.01)
*G06T 7/32* (2017.01)
*G06T 3/00* (2006.01)

(52) U.S. Cl.
CPC ...... *G06T 7/32* (2017.01); *G06T 2207/30168* (2013.01); *G06T 2207/30184* (2013.01)

(56) References Cited

U.S. PATENT DOCUMENTS

| | | | | |
|---|---|---|---|---|
| 2008/0192129 | A1* | 8/2008 | Walker | G11B 27/034 348/231.2 |
| 2008/0310700 | A1* | 12/2008 | Fukusawa | B07C 5/342 382/141 |
| 2010/0189339 | A1* | 7/2010 | Amanullah | G06T 7/401 382/145 |
| 2013/0272569 | A1* | 10/2013 | Yumbe | G06K 9/3241 382/103 |
| 2014/0354826 | A1* | 12/2014 | Kolarov | H04N 17/002 348/175 |
| 2015/0016683 | A1* | 1/2015 | Kinoshita | H04N 5/23219 382/103 |

FOREIGN PATENT DOCUMENTS

| | | |
|---|---|---|
| JP | 2007-299171 A | 11/2007 |
| JP | 2009-239804 A | 10/2009 |
| JP | 2010-016847 A | 1/2010 |
| JP | 2013-164786 A | 8/2013 |
| WO | 02/23480 A1 | 3/2002 |
| WO | 2005/065283 A2 | 7/2005 |
| WO | 2015/113568 A1 | 8/2015 |

OTHER PUBLICATIONS

Chiba Repo—Shimin to Gyosei o Tsunagu Atarashii Communication Tool—(Chiba-Ken Chiba-Shi), Future [online], Mar. 2015 [retrieval date Nov. 18, 2016], Internet: <http://www.applic.or.jp/pdf/futuer_18/04/10.pdf>, vol. 18, pp. 128-133.
International Search Report issued in PCT/JP2016/076731; dated Dec. 6, 2016.
Written Opinion issued in PCT/JP2016/076731; dated Dec. 6, 2016.
International Preliminary Report on Patentability issued in PCT/JP2016/076731; dated Apr. 3, 2018.
Extended European Search Report issued by the European Patent Office on Jul. 31, 2018, which corresponds to EP16851104.6-1217 and is related to U.S. Appl. No. 15/911,378.
An Office Action mailed by the State Intellectual Property Office of the People's Republic of China dated Dec. 10, 2019, which corresponds to Chinese Patent Application No. 201680055276.7 and is related to U.S. Appl. No. 15/911,378.

* cited by examiner

IMAGE REGISTRATION DEVICE, IMAGE REGISTRATION METHOD, IMAGE REGISTRATION SYSTEM, AND IMAGING TERMINAL

CROSS-REFERENCE TO RELATED APPLICATIONS

This application is a Continuation of PCT International Application No. PCT/JP2016/076731 filed on Sep. 12, 2016, which claims priority under 35 U.S.C § 119(a) to Japanese Patent Application No. 2015-193483 filed on Sep. 30, 2015. Each of the above application(s) is hereby expressly incorporated by reference, in its entirety, into the present application.

BACKGROUND OF THE INVENTION

1. Field of the Invention

The present invention relates to an image registration device, an image registration method, an image registration system, and an imaging terminal for use in the image registration system which register a captured image of an inspection target in a database.

2. Description of the Related Art

Inspection of various buildings (buildings, structures construction, or infrastructures; inspection target) such as bridges, roads, tunnels, dams, or buildings is performed by an inspecting person with expertise. The inspecting person uses various imaging terminals such as a smartphone, a tablet terminal, or a digital camera to image an inspection portion of the building. An inspection image obtained by this imaging is registered in a database for building management and is used for management (maintenance inspection or inspection and management) of the building.

JP2013-164786A discloses an imaging support device that outputs information on an inspection portion not imaged by an imaging terminal to the imaging terminal by specifying a building that is an imaging target on the basis of position information acquired from the imaging terminal and then specifying an inspection portion of the building by referring to an inspection reference of the building. Accordingly, inspection images of various buildings can be acquired without omission of the inspection and registered in a database for building management.

In recent years, since the number of buildings that are inspection targets has significantly increased as compared with the number of inspecting persons, the inspecting persons cannot sufficiently perform inspection of the buildings. Therefore, in recent years, efforts have been performed to acquire a captured image of a building in which damage occurs from an ordinary person and register the captured image in a database for building management (see "Chibarepo~new communication tool connecting citizen and administration~(Chiba-prefecture, Chiba-city)", [online], [Searched on Aug. 31, 2015], Internet http://www.applic.or.jp/pdf/futuer_18/04/10.pdf). "Chibarepo~new communication tool connecting citizen and administration~ (Chiba-prefecture, Chiba-city)", [online], [Searched on Aug. 31, 2015], Internet http://www.applic.or.jp/pdf/futuer_18/04/10.pdf discloses that a building management system acquires captured image data from an imaging terminal of an ordinary person who has imaged a building in which damage occurs, and registers the captured image data acquired from the imaging terminal in a database for building management.

SUMMARY OF THE INVENTION

Incidentally, the captured image captured by an ordinary person as described in "Chibarepo~new communication tool connecting citizen and administration~(Chiba-prefecture, Chiba-city)", [online], [Searched on Aug. 31, 2015], Internet http://www.applic.or.jp/pdf/futuer_18/04/10.pdf has poor image quality, and a building in the image cannot be specified. Therefore, the captured image cannot be used in place of an inspection image captured by an inspecting person in many cases. Further, in a case where all captured images transmitted from the ordinary person are registered in the database for building management, the number of pieces of captured image data registered in the database becomes enormous.

The present invention has been made in view of the above circumstances, and an object of the present invention is to provide an image registration device, an image registration method, an image registration system, and an imaging terminal for use in the image registration system that acquire a captured image that can be used for management of an inspection target from an imaging terminal of an ordinary person, and register the captured image in a database.

An image registration device for achieving the object of the present invention is an image registration device that registers a captured image of an inspection target acquired from an imaging terminal which images the inspection target in a database, the image registration device comprising: an acquisition unit that acquires the captured image and an imaging position of the captured image from the imaging terminal; an inspection target specifying unit that specifies the inspection target that is an imaging target of the imaging terminal on the basis of the imaging position acquired by the acquisition unit; a first evaluation unit that evaluates whether or not the captured image acquired by the acquisition unit satisfies a predetermined reference for an image that is used for management of the inspection target; and a registration unit that registers the captured image evaluated as satisfying the reference by the first evaluation unit in the database in association with information indicating the inspection target specified by the inspection target specifying unit; and a second evaluation unit that performs comparison and evaluation on the captured image in the database and the captured image evaluated as satisfying the reference on the basis of a predetermined comparison and evaluation item in a case where the first evaluation unit evaluates that the captured image satisfies the reference and in a case where a captured image of the inspection target specified by the inspection target specifying unit is registered in the database, wherein the registration unit registers the captured image evaluated as satisfying the reference in the database in a case where the evaluation of the captured image evaluated as satisfying the reference is higher than that of the captured image in the database in the comparison and evaluation of the second evaluation unit.

According to this image registration device, it is possible to evaluate whether or not a captured image acquired from an imaging terminal of an ordinary person satisfies a reference for an image that is used for management of an inspection target, and register only captured images satisfying the reference in the database.

Moreover, since the captured image of which the evaluation is lower than that of the existing captured images in the database is prevented from being registered in the database, it is possible to suppress the number of captured images that are registered in the database.

In the image registration device according to yet another aspect of the present invention, the registration unit registers the captured image evaluated as satisfying the reference by the first evaluation unit in the database in association with information including imaging date and time and the imaging position of the captured image. By associating information including the imaging date and time and the imaging position with the captured image, it is possible to use this captured image for management of the inspection target.

In the image registration device according to yet another aspect of the present invention, the acquisition unit further acquires imaging date and time of the captured image from the imaging terminal, a date and time at which maintenance inspection of the inspection target has been performed is registered in the database for each inspection target, the image registration device further comprises a third evaluation unit that acquires the date and time of the maintenance inspection for the inspection target from the database in a case where the first evaluation unit evaluates that the captured image satisfies the reference, and in a case where a captured image of the inspection target specified by the inspection target specifying unit is registered in the database, and evaluates whether or not the imaging date and time acquired by the acquisition unit is after the acquired date and time of the maintenance inspection, and the registration unit registers the captured image evaluated as satisfying the reference in the database in a case where the third evaluation unit evaluates that the imaging date and time is after the date and time of the maintenance inspection. Accordingly, since the captured image of the inspection target before maintenance inspection, that is, a captured image that does not indicate a state of a current inspection target is prevented from being registered in the database, it is possible to suppress the number of captured images that are registered in the database.

In the image registration device according to yet another aspect of the present invention, the acquisition unit further acquires the imaging date and time of the captured image from the imaging terminal, a damage date and time which is a date and time at which the damage of the inspection target has occurred is registered in the database in a case where damage occurs in the inspection target, the image registration device further comprises a fourth evaluation unit that acquires the damage date and time in the inspection target from the database in a case where the first evaluation unit evaluates that the captured image satisfies the reference, and in a case where a captured image of the inspection target specified by the inspection target specifying unit is registered in the database, and evaluates whether or not the imaging date and time acquired by the acquisition unit is after the acquired damage date and time, and the registration unit registers the captured image evaluated as satisfying the reference in the database in a case where the fourth evaluation unit evaluates that the imaging date and time is after the damage date and time. Accordingly, since the captured image of the inspection target before occurrence of damage due to disasters, accidents, or the like, that is, a captured image that does not indicate a state of a current inspection target is prevented from being registered in the database, it is possible to suppress the number of captured images that are registered in the database.

In the image registration device according to yet another aspect of the present invention, the reference includes a predetermined reference for image quality of a captured image, and the first evaluation unit evaluates whether or not image quality of the captured image satisfies the reference for image quality on the basis of a result of analyzing the image quality of the captured image. Accordingly, captured images that do not satisfy the reference for image quality is prevented from being registered in the database.

In the image registration device according to yet another aspect of the present invention, the reference includes the fact that the captured image is an image obtained by imaging a specific type of damage that has occurred in the inspection target, and the first evaluation unit evaluates whether or not the captured image satisfies the reference on the basis of a result of analyzing whether or not the image of the specific type of damage is included in the captured image. Accordingly, it is possible to register only the captured image obtained by imaging a specific type of damage in the database.

In the image registration device according to yet another aspect of the present invention, the reference includes the fact that specific information for use in specifying of the inspection target in the inspection target specifying unit is added to the captured image, and the first evaluation unit evaluates whether or not the captured image satisfies the reference on the basis of whether or not the specific information is added to the captured image. Accordingly, a captured image in which the inspection target specifying unit cannot specify the inspection target is prevented from being registered in the database.

In the image registration device according to yet another aspect of the present invention, the reference includes the fact that an imaging date and time of the captured image can be specified, and the first evaluation unit evaluates whether or not the captured image satisfies the reference on the basis of whether or not the imaging date and time of the captured image can be specified. Accordingly, captured images with unclear imaging date and time are prevented from being registered in the database.

In the image registration device according to yet another aspect of the present invention, the reference includes the fact that the captured image is an image before an editing process, and the first evaluation unit evaluates whether or not the captured image satisfies the reference on the basis of whether or not the captured image is an image before the editing process. Accordingly, the edited captured image is prevented from being registered in the database.

The image registration device according to yet another aspect of the present invention further comprises a privilege information output unit that outputs privilege information indicating a privilege to be imparted to a user of the imaging terminal to the imaging terminal that is an output source of the captured image in a case where the registration unit registers the captured image in the database. Accordingly, it is possible to request a user (an ordinary person) of the imaging terminal to perform imaging of an inspection target in which damage occurs and output the captured image to the image registration device.

In the image registration device according to yet another aspect of the present invention, in a case where the acquisition unit acquires the captured image from the imaging terminal of a predetermined specific user, the evaluation in the first evaluation unit is stopped, and the captured image is registered in the database by the registration unit. Accordingly, it is possible to reduce a calculation load of the image registration device.

An image registration system for achieving the object of the present invention comprises an imaging terminal that images an inspection target, and the image registration device described above, wherein the imaging terminal comprises a terminal side output unit that outputs a captured image of the inspection target and an imaging position of the captured image to the image registration device.

An imaging terminal for achieving the object of the present invention constitutes the image registration system described above.

An image registration method for achieving the object of the present invention is an image registration method that registers a captured image of an inspection target acquired from an imaging terminal which images the inspection target in a database, the image registration method comprising: an acquisition step of acquiring the captured image and an imaging position of the captured image from the imaging terminal; an inspection target specifying step of specifying the inspection target that is an imaging target of the imaging terminal on the basis of the imaging position acquired in the acquisition step; a first evaluation step of evaluating whether or not the captured image acquired in the acquisition step satisfies a predetermined reference for an image that is used for management of the inspection target; a registration step of registering the captured image evaluated as satisfying the reference in the first evaluation step in the database in association with information indicating the inspection target specified in the inspection target specifying step; and a second evaluation step of comparing and evaluating the captured image in the database and the captured image evaluated as satisfying the reference on the basis of a predetermined comparison and evaluation item, in a case where it is evaluated that the captured image satisfies the reference in the first evaluation step and in a case where a captured image of the inspection target specified by the inspection target specifying step is registered in the database; wherein the registration step is step of registering the captured image evaluated as satisfying the reference in the database, in a case where the evaluation of the captured image evaluated as satisfying the reference is higher than that of the captured image in the database in the comparing and evaluating of the second evaluation step.

The image registration device, the image registration method, the image registration system, and the imaging terminal of the present invention can acquire a captured image that can be used for management of an inspection target from an imaging terminal of an ordinary person, and register the captured image in a database.

DESCRIPTION OF THE PREFERRED EMBODIMENTS

[Image Registration System of First Embodiment]

Figure 1:
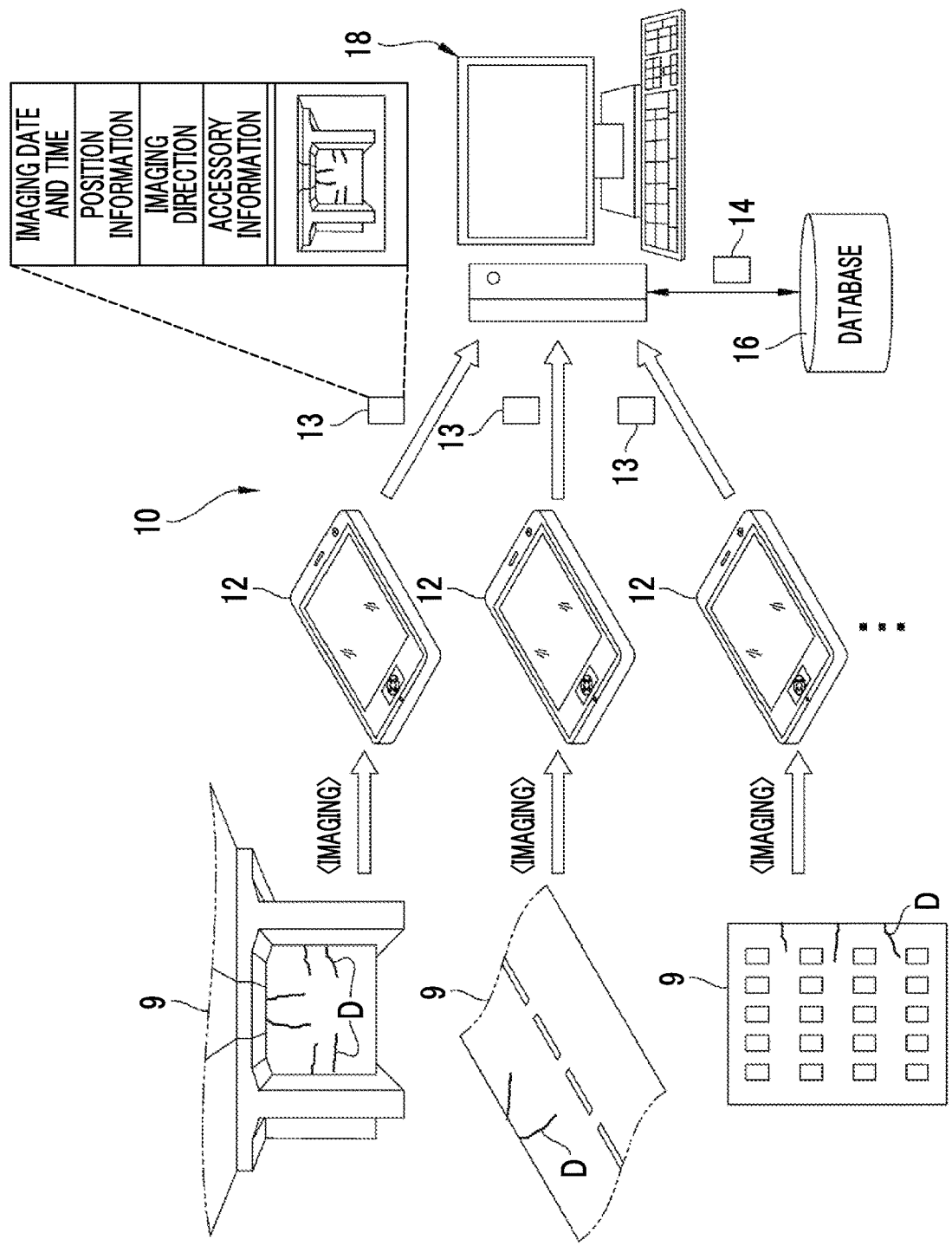
FIG. 1 is a schematic diagram of an image registration system according to a first embodiment.

FIG. 1 is a schematic diagram of an image registration system 10 according to a first embodiment of the present invention. As illustrated in FIG. 1, in the image registration system 10, captured image data 13 of a building 9 is acquired from an imaging terminal 12 owned by an unspecified ordinary person, and the captured image data 13 is registered in a database 16 as inspection image data 14 of the building 9. The building 9 corresponds to an inspection target of the present invention (an object that can be an inspection or management target), and includes a bridge, a road, a tunnel, a dam, an embankment, a building, or the like. Further, the ordinary person refers to a person who does not have expertise regarding the inspection of the building 9. Further, the inspection image data 14 corresponds to an image for use in management of the inspection target of the present invention, and refers to captured image data 13 which can be used for management (maintenance inspection, inspection management, and maintenance management) of the building 9, such as image data that an inspection person (expert) having expertise regarding the inspection of the building 9 has captured using the imaging terminal 12, which has been registered in the database 16. Further, use in management of the building 9 means recognizing a degree of the damage D occurring in the building 9 on the basis of at least the inspection image data 14 (the captured image data 13 registered in the database 16) or determining, for example, necessity or a frequency of maintenance inspection (repair or inspection).

The image registration system 10 includes an imaging terminal 12, and an image registration device 18 that registers captured image data 13 satisfying a predetermined reference for inspection image data 14 for use in management of the building 9 among pieces of captured image data 13 captured by the imaging terminal 12 in a database 16. For the image registration device 18, for example, a personal computer, a server, or the like is preferably used.

In the present invention, the "terminal" means a device having an information communication function (preferably, a wireless communication function). For the imaging terminal 12, for example, various portable terminals having an imaging function such as a smartphone, a tablet terminal, or a portable personal computer, or a digital camera having a communication function (preferably, a wireless communication function), or the like is suitably used. The imaging terminal 12 images the building 9, generates the captured image data 13 of the building 9, and outputs the captured image data 13 to the image registration device 18. For example, the ordinary person who has found the building 9 in which damage D has occurred images the building 9 using its own imaging terminal 12, and outputs the captured image data 13 from the imaging terminal 12 to the image registration device 18.

Tag information is added to the captured image data 13. The tag information includes an imaging date and time of the captured image data 13, position information indicating an imaging position of the captured image data 13, an imaging direction of the imaging terminal 12 at the time of capturing of the captured image data 13, accessory information, and the like. The imaging date and time can be acquired from a clock unit built into the imaging terminal 12. The position information can be acquired from a global positioning system (GPS) sensor or a gyro sensor, an acceleration sensor, or the like built into the imaging terminal 12. The imaging direction can be obtained from a geomagnetic sensor, a posture detection sensor, or the like built into the imaging terminal 12. The accessory information includes information such as an ID (identification) which is an identification number indicating a user (that is, a photographer) of the imaging terminal 12, an e-mail address of the photographer, a model name of the imaging terminal 12, or the like.

Figure 2:
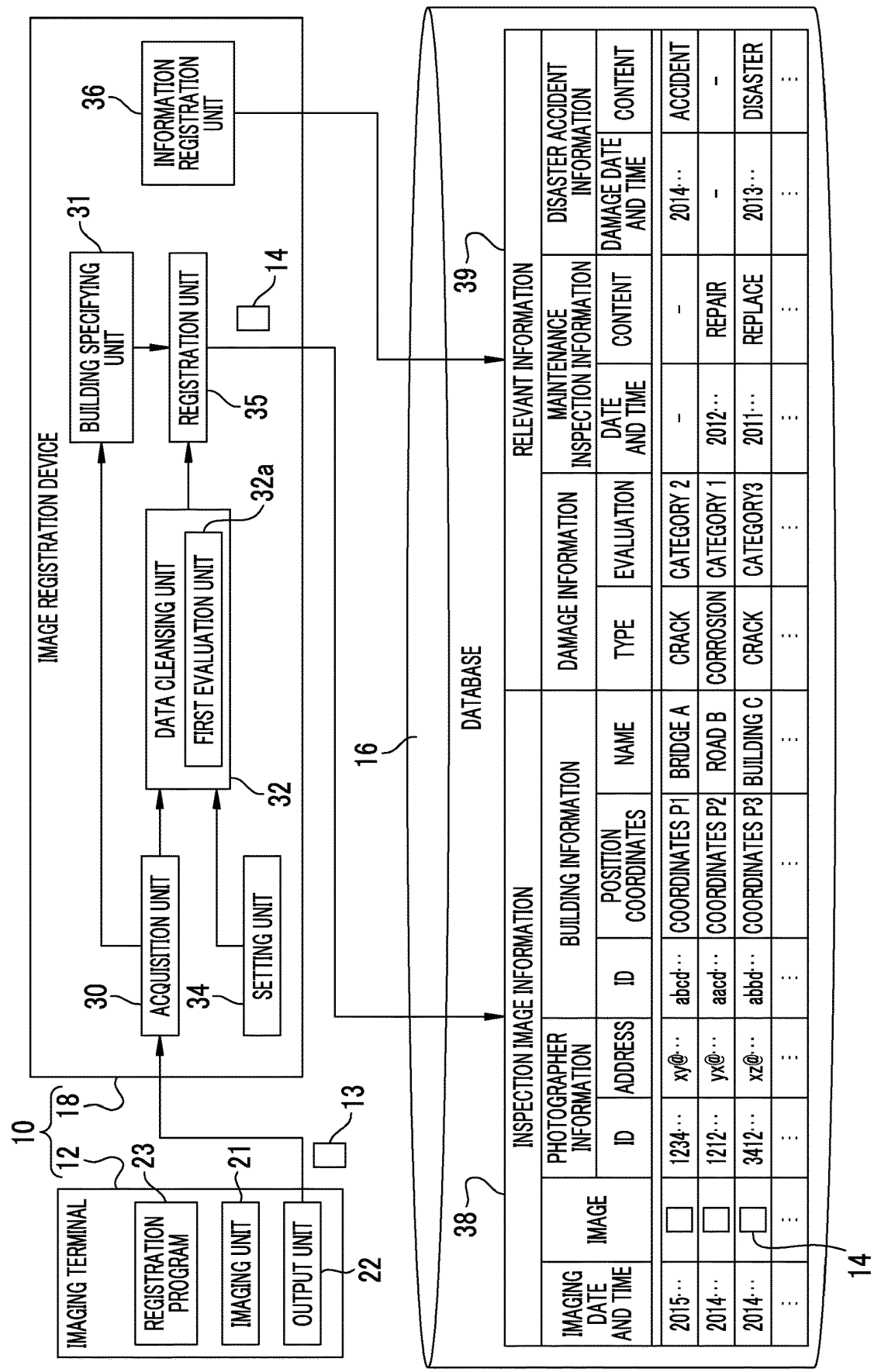
FIG. 2 is a block diagram illustrating a configuration of the image registration system according to the first embodiment.

FIG. 2 is a block diagram illustrating a configuration of the image registration system 10 (the imaging terminal 12 and the image registration device 18) of the first embodiment. As illustrated in FIG. 2, the imaging terminal 12 includes an imaging unit 21, and an output unit 22 corresponding to a terminal side output unit of the present invention, and also stores a registration program 23.

The imaging unit 21 includes an optical system and an image sensor. In a case where an imaging operation is input to the imaging terminal 12, the imaging unit 21 images the building 9 and generates captured image data 13 (including the tag information described above) that is a captured image of the present invention. The output unit 22 outputs the captured image data 13 generated by the imaging unit 21 to the image registration device 18 under the control of the registration program 23 to be described below.

The registration program 23 is an application program (software) for outputting the captured image data 13 captured by the imaging terminal 12 from the imaging terminal 12 to the image registration device 18. In a case where the registration program 23 is started up in the imaging terminal 12, an image registration screen 25 (see FIG. 3) is displayed on the display unit of the imaging terminal 12.

Figure 3:
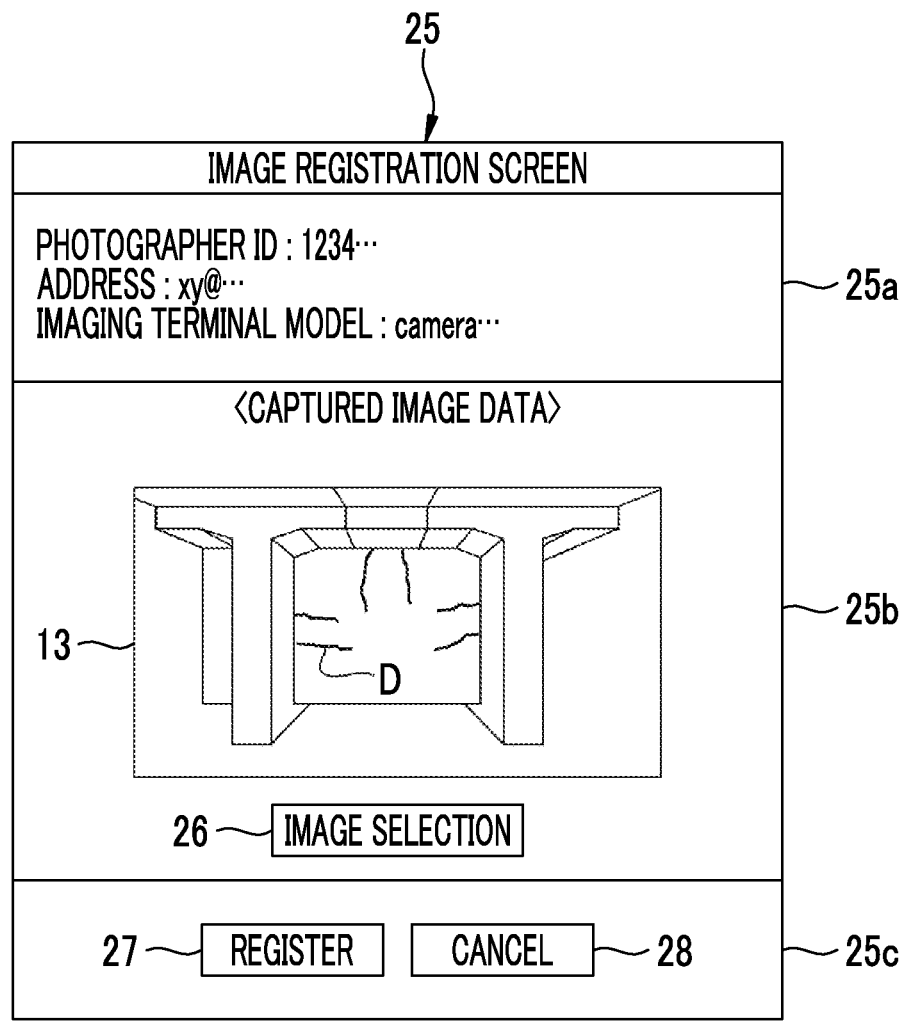
FIG. 3 is a front view illustrating an example of an image registration screen that is displayed on an imaging terminal.

FIG. 3 is a front view illustrating an example of the image registration screen 25 that is displayed on the imaging terminal 12. A photographer information column 25a in which information on a user (that is, a photographer) of the imaging terminal 12 is displayed, an image display column 25b in which the captured image data 13 to be output to the image registration device 18 is displayed, and an operation column 25c for performing an operation of outputting the captured image data 13 to the image registration device 18 are provided on the image registration screen 25.

In the photographer information column 25a, a "photographer ID" indicating an ID of the photographer (suitably referred to as a user or an ordinary person) is displayed. In this example, an "imaging terminal model" indicating a model name of the imaging terminal 12 owned by the photographer, and an "address" indicating an electronic mail address of the photographer are displayed. The photographer information is not limited to the content displayed in the photographer information column 25a of this example.

In the image display column 25b, the captured image data 13 to be output to the image registration device 18 is displayed. An image selection button 26 for selecting the captured image data 13 to be output to the image registration device 18 is provided in the image display column 25b. By operating this image selection button 26, a list of captured image data 13 stored in the imaging terminal 12 is displayed, and the captured image data 13 to be output to the image registration device 18 can be selected from this list.

A registration button 27 and a cancel button 28 are provided in the operation column 25c. In a case where the registration button 27 is operated, the captured image data 13 displayed in the image display column 25b is output to the image registration device 18 by the output unit 22. On the other hand, in a case where the cancel button 28 is operated, the output of the captured image data 13 to the image registration device 18 is stopped.

A method of outputting the captured image data 13 from the imaging terminal 12 to the image registration device 18 is not limited to the method performed via the image registration screen 25 (registration program 23), and various methods such as attaching the captured image data 13 to an e-mail and forwarding the captured image data 13 may be used.

<Configuration of Image Registration Device of First Embodiment>

Referring back to FIG. 2, the image registration device 18 is configured of, for example, various calculation units including a central processing unit (CPU), a processing unit, and a storage unit. The image registration device 18 includes an acquisition unit 30, a building specifying unit 31 corresponding to an inspection target specifying unit of the present invention, a data cleansing unit 32, a first evaluation unit 32a, a setting unit 34, a registration unit 35, and an information registration unit 36.

The acquisition unit 30 is, for example, a communication interface that can be communicatably wiredly or wirelessly connected to the imaging terminal 12. The acquisition unit 30 outputs the captured image data 13 acquired from the imaging terminal 12 to the data cleansing unit 32, and also outputs the "position information" and the "imaging direction" included in the tag information (see FIG. 1) of the captured image data 13 to the building specifying unit 31.

The building specifying unit 31 specifies the building 9 that is an imaging target of the imaging terminal 12 (that is, the building 9 within the captured image data 13) on the basis of the "position information" and the "imaging direction" of the captured image data 13 input from the acquisition unit 30, and known map information (not illustrated) in which positions of a plurality of buildings 9 have been recorded. The building specifying unit 31 outputs "building information" including, for example, an ID which is an identification number attached to the building 9 in advance, positional coordinates (also an address) on the map of the building 9, and a name of the building 9 to the registration unit 35 as a result of specifying the building 9.

The data cleansing unit 32 deletes data that does not satisfy the predetermined reference for the inspection image data 14 among the pieces of captured image data 13 input from the acquisition unit 30, and outputs only the captured image data 13 satisfying this reference to the registration unit 35. The evaluation as to whether or not the captured image data 13 satisfies the predetermined reference is executed by the first evaluation unit 32a to be described below provided within the data cleansing unit 32. Further, the "predetermined reference" in a case where the first evaluation unit 32a evaluates the captured image data 13 is set by the setting unit 34 (see FIG. 4) to be described below.

The registration unit 35 registers the captured image data 13 input from the data cleansing unit 32 in the database 16 as the inspection image data 14 obtained by imaging the building 9 specified by the building specifying unit 31. Here, the captured image data 13 (inspection image data 14) evaluated as satisfying the predetermined reference by the first evaluation unit 32a is registered in the database 16 in association with information including the imaging date and time and the imaging position, and the information indicating the building 9 specified by the building specifying unit 31. Specifically, the registration unit 35 registers the inspection image data 14, the "imaging date and time" included in the tag information (see FIG. 1) of the original captured image data 13, the "photographer information" including, for example, the photographer ID or the address included in the accessory information of the tag information, and the inspection image information 38 including the "building information" input from the building specifying unit 31 in the database 16. Here, the "building information" corresponds to information indicating the inspection target of the present invention, and the "positional coordinates" in this "building information" are information indicating the "imaging position". Other information (for example, model information of the imaging terminal 12) may be added to the inspection image information 38.

The information registration unit 36 receives an information input operation from an administrator of the image registration system 10 and registers relevant information 39 including "damage information", "maintenance inspection information", and "disaster accident information" for each piece of inspection image information 38 (inspection image data 14) in the database 16.

The "damage information" includes "type" and "evaluation" of the damage D that occurs in the building 9 imaged in the inspection image data 14 and can be obtained by a person having expertise in inspection of buildings 9 such as an inspecting person confirming the inspection image data 14 registered in the database 16.

The "type" of the damage D indicates a type of known damage that occurs in the building 9, such as crack, corrosion, looseness, rupture, deflection, or water leakage. The "evaluation" of the damage D is an evaluation of a degree of the damage D occurring in the building 9. In this example, the degree of the damage D is classified into four categories including category 1 (a state in which there is no influence on a function of the building 9), category 2 (a state in which there is no influence on the function of the building 9, but it is preferable to take measures from the viewpoint of preventive maintenance), category 3 (a state in which influence on the function of the building 9 is likely to occur, and measures should be taken at an early stage), and category 4 (a state in which influence on the function of the building 9 has occurred or influence on the function of the building is highly likely to occur, and measures should be taken urgently), and evaluated. For details of the four categories, please refer to a periodic road bridge inspection procedure or a periodic bridge inspection procedure issued by the Ministry of Land, Infrastructure and Transport. A method of "evaluating" the damage D is not particularly limited to the categorization.

The "maintenance inspection information" is information indicating a history of maintenance inspection (repair, or inspection by an inspecting person) performed on the building 9 imaged in the inspection image data 14, and includes "date and time" of maintenance inspection and "content". Image data of the building 9 before and after maintenance inspection may be added to "content".

The "disaster accident information" is information indicating a history of the damage D due to disaster or accident that has occurred for the building 9 imaged in the inspection image data 14, and includes "date and time" when the damage D has occurred in the building 9 due to the disaster or the accident and "content" of the damage D (cause). Image data of the building 9 before and after the occurrence of the damage D due to the disaster or the accident may be added to "disaster accident information".

Figure 4:
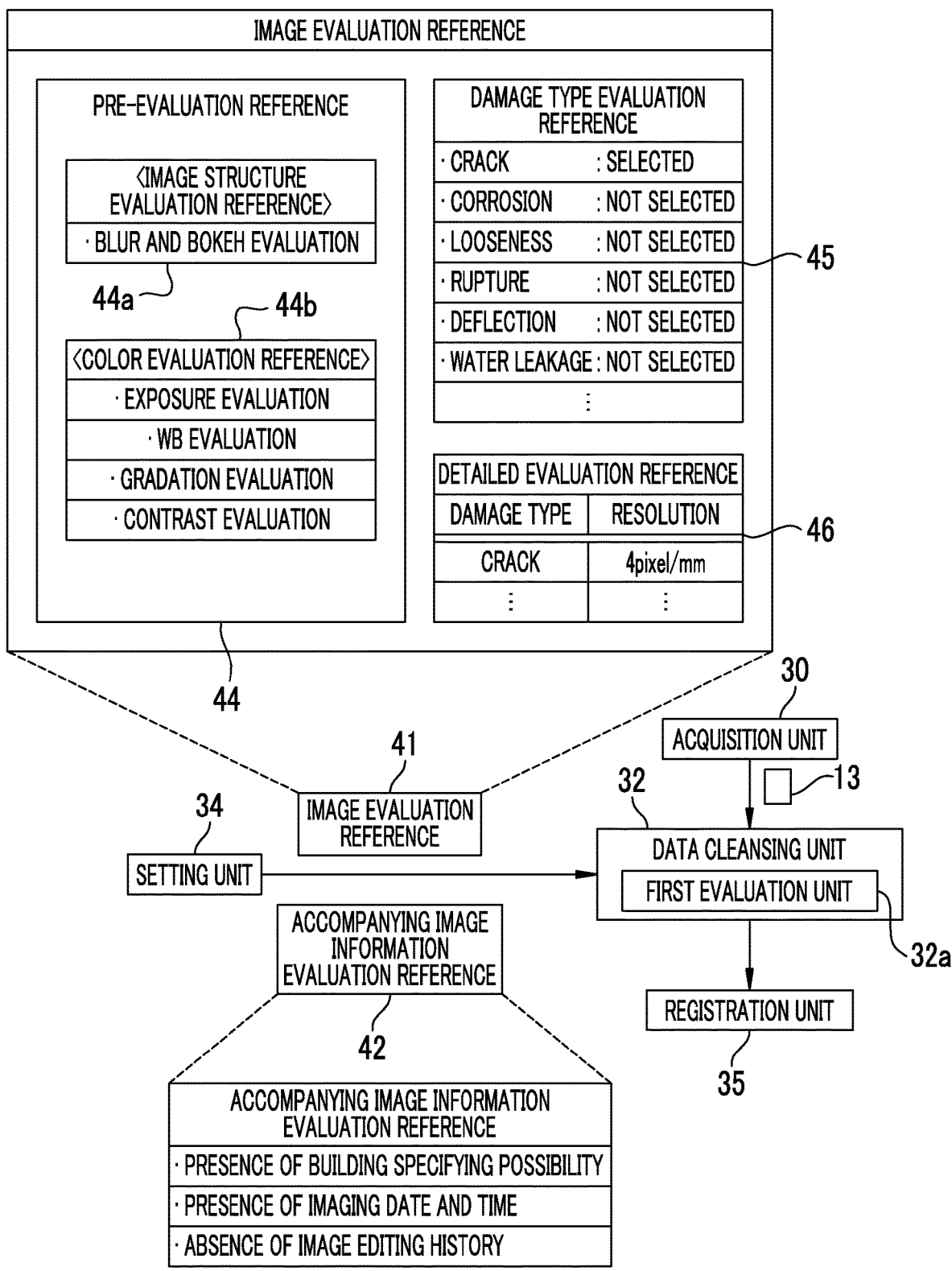
FIG. 4 is an illustrative diagram illustrating evaluation content of captured image data in a first evaluation unit.

FIG. 4 is an illustrative diagram illustrating evaluation content of the captured image data 13 in the first evaluation unit 32a. As illustrated in FIG. 4, the first evaluation unit 32a evaluates whether or not the captured image data 13 input from the acquisition unit 30 satisfies the reference set by the setting unit 34, which is a predetermined reference for the inspection image data 14. The setting unit 34 is, for example, an operation unit such as a keyboard or a mouse of the image registration device 18. The setting unit 34 receives an input of a reference setting operation from the administrator of the image registration system 10, and sets the "predetermined reference for the inspection image data 14" for the first evaluation unit 32a. This reference includes "image evaluation reference 41" which is an evaluation reference of the image itself of the captured image data 13, and "accompanying image information evaluation reference 42" which is an evaluation reference other than the image of the captured image data 13.

The image evaluation reference 41 includes a pre-evaluation reference 44, a damage type evaluation reference 45, and a detailed evaluation reference 46. The pre-evaluation reference 44 and the detailed evaluation reference 46 correspond to references of image quality of a captured image of the present invention.

The pre-evaluation reference 44 includes an image structure evaluation reference 44a and a color evaluation reference 44b. The image structure evaluation reference 44a is a reference for blur and bokeh evaluation of the captured image data 13. For the blur and bokeh of the captured image data 13, the less the high-frequency components included in the captured image data 13 are, the more the blur and bokeh occurs. Conversely, the more the high-frequency components are, the less the blur and bokeh occurs. Therefore, the image structure evaluation reference 44a (the blur and bokeh evaluation reference) in this example is a lower limit value of the component amount of the high-frequency components included in the captured image data 13.

The color evaluation reference 44b includes a reference for exposure evaluation of the captured image data 13, a reference for white balance (WB) evaluation, a reference for gradation evaluation, and a reference for contrast evaluation. The reference for exposure evaluation is a reference for evaluating whether or not imaging of the building 9 in the imaging terminal 12 has been performed with appropriate exposure. For example, in a case where an average value of exposure evaluation values that are obtained by analyzing the captured image data 13 is smaller than a predetermined lower limit value, it can be determined that an imaging environment of the imaging terminal 12 is a low illuminance environment. Therefore, the reference for exposure evaluation in this example is a lower limit value of the average value of the exposure evaluation values obtained by analyzing the captured image data 13.

The reference for WB evaluation is a reference for evaluating whether or not white balance of the captured image data 13 is appropriate. For example, in a case where a sum of and a difference between a R (Red) signal and a G signal (Green), and a B (Blue) signal and the G signal are within a defined range with reference to the G signal of the captured image data, the white balance can be determined to be appropriate. Therefore, the reference of the WB evaluation in this example is the defined range of the sum of and difference between the R signal and the G signal, and the B signal and the G signal of the captured image data.

The reference for gradation evaluation is a reference for evaluating whether or not a gradation distribution of the captured image data 13 is appropriate. For example, as the number of pixels on both ends of a lateral axis in a brightness histogram (a lateral axis indicates a brightness value, and a vertical axis indicates number of pixels) indicating a gradation distribution of the captured image data 13 increases, it becomes easy for a blackened region or a wash-out region to occur in the captured image data 13. Therefore, the reference for gradation evaluation in this example is an upper limit value of the number of pixels on both ends of the brightness histogram of the captured image data 13.

The reference for contrast evaluation is a reference for evaluating whether or not contrast of the captured image data 13 is appropriate. For example, in a case where there is no difference in overall lightness of the captured image data 13, that is, in a case where a distribution range of the brightness value (concentration) in the brightness histogram of the captured image data 13 is narrow, the captured image data 13 becomes an image difficult to view. Therefore, the reference for evaluation of the contrast in this example is a lower limit value of the distribution range of the brightness value in the brightness histogram of the captured image data 13.

The damage type evaluation reference 45 is a reference for evaluating whether or not the damage D occurring in the building 9 imaged in the captured image data 13 is a predetermined specific damage D. One or more damage D ("cracks" in this example) among a plurality of types of damages D are selected as the specific damages D.

The detailed evaluation reference 46 is a reference for evaluating whether or not the captured image data 13 has an appropriate resolution determined for each type of damage D in advance. For example, in a case where the type of the damage D is "crack" and the resolution of the captured image data 13 is 4 pixels/mm, the resolution of the captured image data 13 is appropriate (10 pixels/mm is more preferable).

The accompanying image information evaluation reference 42 includes "presence of building specifying possibility", "presence of imaging date and time", and "absence of image editing history".

The "presence of building specifying possibility" is specific information of the present invention with which the building 9 can be specified by the building specifying unit 31 described above and indicates that "position information" and "imaging direction" (see FIG. 1) are included in the tag information of the captured image data 13. The "presence of imaging date and time" indicates that the imaging date and time of the captured image data 13 can be specified, and specifically, "imaging date and time" is included in the tag information of the captured image data 13 (see FIG. 1). The "absence of image editing history" indicates that the captured image data 13 is image data before the editing process and, specifically, an editing date and time or the like of the image data is not registered in the tag information of the captured image data 13.

The first evaluation unit 32a performs the image evaluation for evaluating whether or not the captured image data 13 input from the acquisition unit 30 to the data cleansing unit 32 satisfies the "image evaluation reference 41" set by the setting unit 34, and the accompanying image information evaluation for evaluating whether or not the captured image data 13 satisfies the "accompanying image information evaluation reference 42" set by the setting unit 34.

<Image Evaluation>

Figure 5:
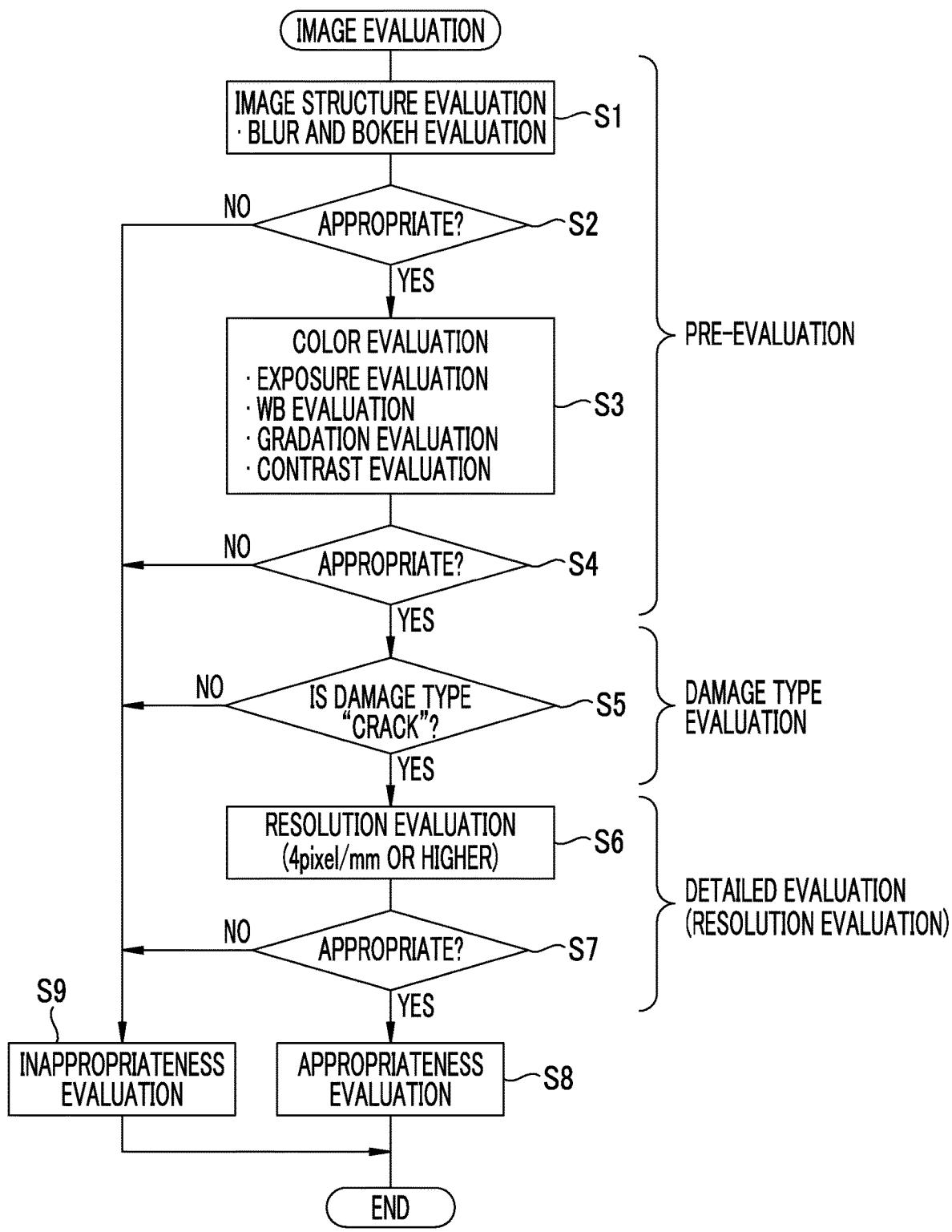
FIG. 5 is a flowchart illustrating a flow of a process of image evaluation in the first evaluation unit.

FIG. 5 is a flowchart illustrating a flow of an image evaluation process in the first evaluation unit 32a. As illustrated in FIG. 5, the first evaluation unit 32a performs pre-evaluation as to whether or not the captured image data 13 satisfies the pre-evaluation reference 44 included in the image evaluation reference 41.

The first evaluation unit 32a detects the high-frequency component included in the captured image data 13 and performs the image structure evaluation (blur and bokeh evaluation) for evaluating whether the component amount of the high-frequency component is equal to or greater than the lower limit value set in the image structure evaluation reference 44a of the pre-evaluation reference 44 (step S1). In a case where the component amount of the high-frequency component of the captured image data 13 is equal to or greater than the lower limit value, the first evaluation unit 32a evaluates that the captured image data 13 is appropriate (YES in step S2). Further, in a case where the component amount of the high-frequency component of the captured image data 13 is smaller than the lower limit value, the first evaluation unit 32a evaluates that the captured image data 13 is inappropriate (NO in step S2).

In a case where the evaluation in step S2 is YES, the first evaluation unit 32a performs the exposure evaluation for evaluating whether or not the average value of the exposure evaluation values obtained by analyzing the captured image data 13 is equal to or greater than the lower limit value of the average value set in the color evaluation reference 44b of the pre-evaluation reference 44.

Further, the first evaluation unit 32a obtains the sum of and difference between the R signal and the G signal, and the B signal and the G signal of the captured image data 13, and performs the WB evaluation for evaluating whether the obtained sum and difference are within the defined range set in the color evaluation reference 44b. Further, the first evaluation unit 32a performs the gradation evaluation for evaluating whether the number of pixels at both ends of the brightness histogram of the captured image data 13 is within the upper limit value of the number of pixels set in the color evaluation reference 44b.

Further, the first evaluation unit 32a performs the contrast evaluation for evaluating whether or not the distribution of the brightness value in the brightness histogram of the captured image data 13 is equal to or greater than the lower limit value of the distribution range of the brightness value set in the color evaluation reference 44b (step S3).

In a case where the first evaluation unit 32a does not evaluate "NO" in all of the exposure evaluation, the WB evaluation, the gradation evaluation, and the contrast evaluation, the first evaluation unit 32a evaluates that the captured image data 13 is appropriate (YES in step S4). On the other hand, in a case where the first evaluation unit 32a evaluates "NO" in any of the evaluations, the first evaluation unit 32a evaluates that the captured image data 13 is inappropriate (NO in step S4). Thus, the pre-evaluation in the first evaluation unit 32a is completed.

In a case where the first evaluation unit 32a estimates YES in step S4, the first evaluation unit 32a starts the damage type evaluation for evaluating whether or not the captured image data 13 satisfies the damage type evaluation reference 45 by analyzing an image of the specific damage D (crack in this example) set in the damage type evaluation reference 45 of the image evaluation reference 41 is included in the captured image data 13 (step S5).

For example, the first evaluation unit 32a specifies the type of damage D occurring in the building 9 from the captured image data 13 by performing a template matching method using template images of various damages D. The method of specifying the type of damage D is not particularly limited. Then, on the basis of a specifying result, the first evaluation unit 32a evaluates whether or not the image of the damage D of the building 9 included in the captured image data 13 is an image of the specific damage D (crack in this example) set in the damage type evaluation reference 45 included in the image evaluation reference 41.

In a case where the image of the damage D of the building 9 included in the captured image data 13 is an image of the crack, the first evaluation unit 32a evaluates that the captured image data 13 is appropriate (YES in step S5). Conversely, in a case where the image of the damage D of the building 9 included in the captured image data 13 is not the image of the crack, the first evaluation unit 32a evaluates that the captured image data 13 is inappropriate (NO in step S5). Thus, the damage type evaluation in the first evaluation unit 32a is completed.

In a case where the first evaluation unit 32a evaluates YES in step S5, the first evaluation unit 32a starts detailed evaluation (resolution evaluation) for evaluating whether or not the resolution of the captured image data 13 satisfies the resolution set in the detailed evaluation reference 46 of the image evaluation reference 41 (step S6).

Specifically, in a case where the specific damage D specified in the previous step S5 is a crack, the first evaluation unit 32a evaluates whether or not the resolution of the captured image data 13 is equal to or higher than the resolution corresponding to the crack set in the detailed evaluation reference 46. In a case where the resolution of the captured image data 13 is equal to or higher than the resolution corresponding to the crack set in the detailed evaluation reference 46, the first evaluation unit 32a evaluates that the captured image data 13 is appropriate (YES in step S7). On the other hand, in a case where the resolution of the captured image data 13 is lower than the resolution corresponding to the crack, the first evaluation unit 32a evaluates that the captured image data 13 is inappropriate (NO in step S7). Thus, the detailed evaluation (resolution evaluation) in the first evaluation unit 32a is completed.

In the case of YES in step S7, the first evaluation unit 32a makes appropriateness evaluation indicating that the captured image data 13 satisfies the reference for image evaluation including pre-evaluation, damage type evaluation, and detailed evaluation (step S8). On the other hand, in the case of NO in any of steps S2, S4, S5, and S7, the first evaluation unit 32a makes inappropriateness evaluation indicating that the captured image data 13 does not satisfy the reference for image evaluation (step S9). Thus, the image evaluation in the first evaluation unit 32a is all completed.

<Accompanying Image Information Evaluation>

Figure 6:
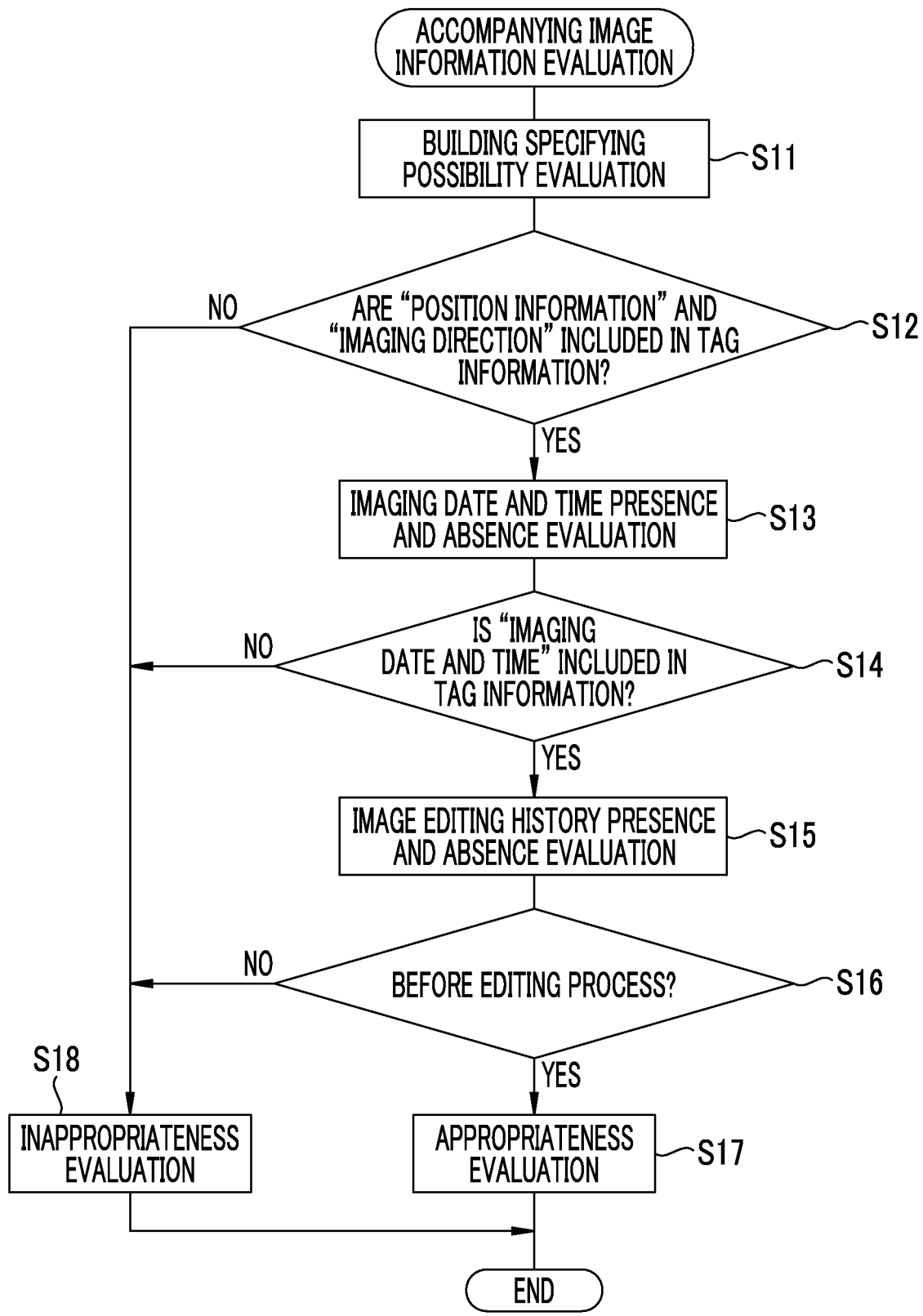
FIG. 6 is a flowchart illustrating a flow of a process of accompanying image information evaluation in a first evaluation unit.

FIG. 6 is a flowchart illustrating a flow of a process of accompanying image information evaluation in the first evaluation unit 32a. As illustrated in FIG. 6, the first evaluation unit 32a starts building specifying possibility evaluation for evaluating whether or not the position information and the imaging direction are included in the tag information of the captured image data 13 on the basis of the "presence of building specifying possibility" included in the accompanying image information evaluation reference 42 (step S11). In a case where the position information and the imaging direction are included in the tag information, the first evaluation unit 32a starts the next evaluation (YES in step S12).

In the case of YES in step S12, the first evaluation unit 32a starts the imaging date and time presence and absence evaluation for evaluating whether or not the imaging date and time is included in the tag information of the captured image data 13 on the basis of the "presence of imaging date and time" included in the accompanying image information evaluation reference 42 (step S13). In a case where the imaging date and time is included in the tag information, the first evaluation unit 32a starts the next evaluation (YES in step S14).

In the case of YES in step S14, the first evaluation unit 32a performs image editing history presence and absence evaluation for evaluating whether or not the captured image data 13 is image data before an editing process on the basis of the "absence of image editing history" included in the accompanying image information evaluation reference 42 (step S15). Specifically, in a case where the editing history such as the editing date and time of the image data is not registered in the tag information of the captured image data 13, the first evaluation unit 32a evaluates that the captured image data 13 is image data before the editing process (YES in step S16). On the other hand, in a case where the editing history of the image data is registered in the tag information, the first evaluation unit 32a evaluates that the captured image data 13 is image data after the editing process (NO in step S16).

In the case of YES in step S16, the first evaluation unit 32a makes appropriateness evaluation indicating that the captured image data 13 satisfies the reference for the accompanying image information evaluation (step S17). On the other hand, in the case of NO in any of steps S12, S14, and S16, the first evaluation unit 32a makes inappropriateness evaluation indicating that the captured image data 13 does not satisfy the reference for accompanying image information evaluation (step S18). Thus, the accompanying image information evaluation in the first evaluation unit 32a is all completed.

<Registration of Inspection Image Data>

Referring back to FIG. 2, the data cleansing unit 32 deletes the captured image data 13 for which the first evaluation unit 32a has performed the inappropriateness evaluation in the image evaluation or the accompanying image information evaluation among the captured image data 13 input from the acquisition unit 30 (that is, the captured image data 13 which does not satisfy a predetermined reference for the inspection image data 14).

On the other hand, the data cleansing unit 32 outputs the captured image data 13 for which the first evaluation unit 32a has performed the appropriate evaluation in both of the image evaluation and the accompanying image information evaluation among the captured image data 13 input from the acquisition unit 30 (that is, the captured image data 13 which satisfies the predetermined reference for the inspection image data 14) to the registration unit 35. Accordingly, the registration unit 35 registers the captured image data 13 in the database 16 as the inspection image data 14 (inspection image information 38).

In a case where the registration unit 35 registers the captured image data 13 in the database 16 as the inspection image data 14, the registration unit 35 may transmit registration information indicating that the captured image data 13 has been registered in the database 16 to the imaging terminal 12 that is an output source of the captured image data 13 on the basis of the electronic mail address included in the accessory information of the tag information of the captured image data 13.

Further, in a case where the captured image data 13 has been deleted by the data cleansing unit 32 (in a case where the first evaluation unit 32*a* has performed the inappropriateness evaluation), information indicating that the captured image data 13 has been deleted may be output to the imaging terminal 12 that is the output source of the captured image data 13. Accordingly, a user of the imaging terminal 12 can be requested to re-image the building 9.

[Operation of Image Registration System of First Embodiment]

Figure 7:
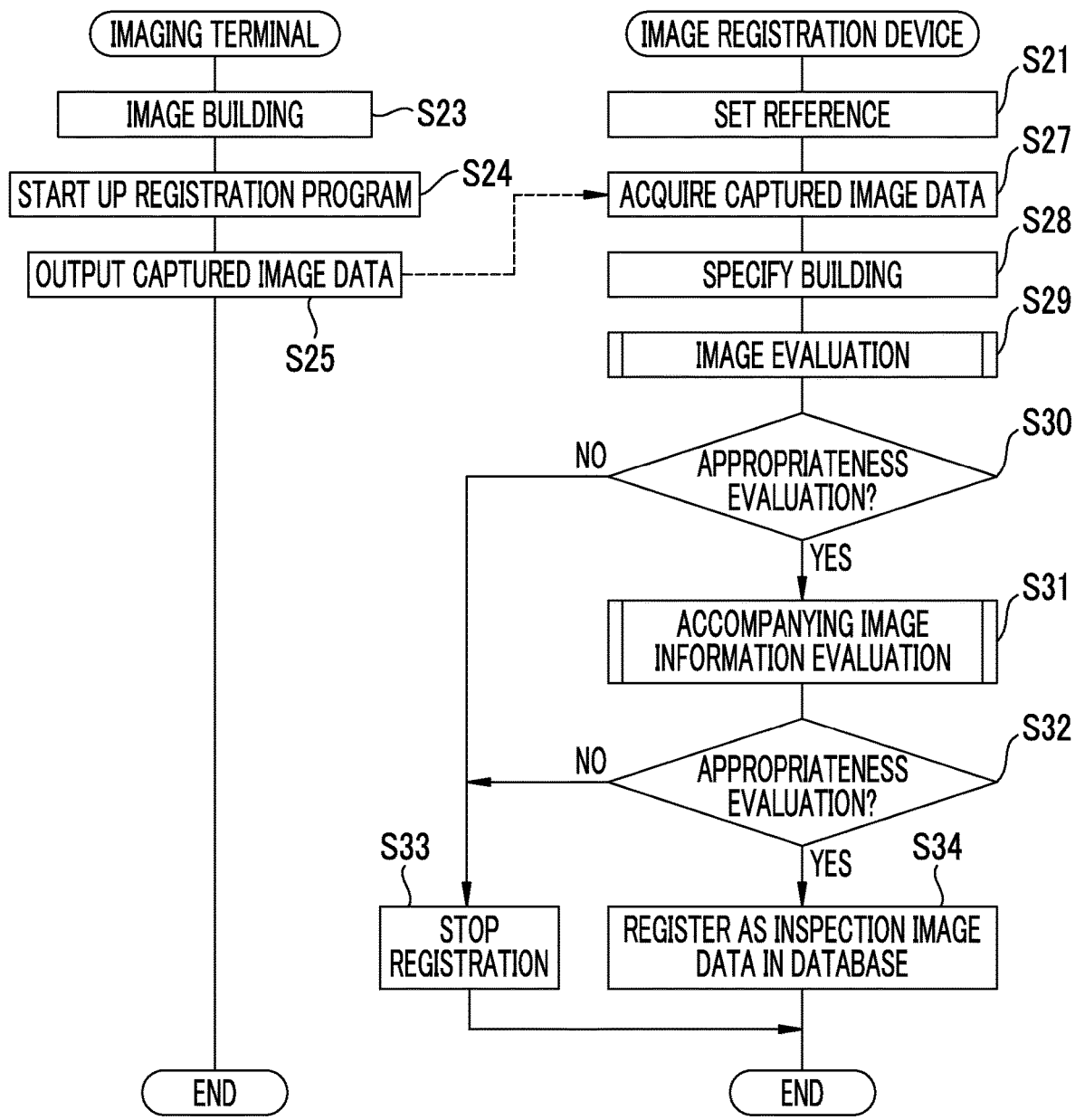
FIG. 7 is a flowchart illustrating a flow of a process of registering inspection image data in a database in the image registration system of the first embodiment.

Next, an operation of the image registration system 10 of the first embodiment will be described with reference to FIG. 7. FIG. 7 is a flowchart illustrating a flow of a process of registering the inspection image data 14 in the database 16 in the image registration system 10 (the image registration device 18) according to the first embodiment (an image registration method of the present invention). The administrator of the image registration system 10 performs a reference setting operation with respect to the image registration device 18 in advance, and the setting unit 34 sets the image evaluation reference 41 and the accompanying image information evaluation reference 42 with respect to the first evaluation unit 32*a* as illustrated in FIG. 4 described above (step S21).

<Imaging Terminal>

The user (ordinary person) of the imaging terminal 12 that has found the damage D of the building 9 adjusts a position or a posture of the imaging terminal 12 so that the building 9 (a place at which the damage D occurs) is included in an imaging range of the imaging terminal 12 owned by the user, and then, inputs an imaging operation to the imaging terminal 12. When the input of the imaging operation is received, the imaging unit 21 of the imaging terminal 12 images the building 9 to generate the captured image data 13 (step S23).

Next, in a case where the user of the imaging terminal 12 performs an operation of starting up the registration program 23, the registration program 23 is started up in the imaging terminal 12, and the image registration screen 25 illustrated in FIG. 3 described above is displayed on the display unit of the imaging terminal 12 (step S24). The user of the imaging terminal 12 operates the image selection button 26 on the image registration screen 25 to select the captured image data 13 to be output to the image registration device 18, and then, operates the registration button 27. Accordingly, the captured image data 13 is output from the output unit 22 of the imaging terminal 12 to the image registration device 18 (step S25).

<Image Registration Device>

The acquisition unit 30 of the image registration device 18 acquires the captured image data 13 output from the imaging terminal 12, outputs the captured image data 13 to the data cleansing unit 32, and outputs the "position information" and the "imaging direction" included in the tag information of the captured image data 13 to the building specifying unit 31 (step S27, which corresponds to an acquisition step of the present invention).

The building specifying unit 31 that has received the input of the "position information" and the "imaging direction" from the acquisition unit 30 specifies the building 9 that is the imaging target of the imaging terminal 12 on the basis of the "position information", the "imaging direction" and known map information, and outputs the building information (see FIG. 2) that is a result of the specifying to the registration unit 35 (step S28, which corresponds to an inspection target specifying step of the present invention).

Further, in a case where the captured image data 13 is input from the acquisition unit 30 to the data cleansing unit 32, the first evaluation unit 32*a* starts the evaluation as to whether the captured image data 13 satisfies the predetermined reference (the image evaluation reference 41 and the accompanying image information evaluation reference 42) for the inspection image data 14.

As illustrated in FIG. 5 described above, the first evaluation unit 32*a* performs the image evaluation (the pre-evaluation, the damage type evaluation, and the detailed evaluation) for evaluating whether or not the captured image data 13 satisfies the image evaluation reference 41 (step S29, which corresponds to a first evaluation step of the present invention).

It is possible to evaluate whether or not the captured image data 13 satisfies the image quality reference for the inspection image data 14 through the pre-evaluation and the detailed evaluation. Further, it is possible to evaluate whether or not an image of a predetermined specific type of damage D is included in the captured image data 13 through the damage type evaluation. In a case where the captured image data 13 satisfies the image evaluation reference 41, the first evaluation unit 32*a* performs the appropriateness evaluation (YES in step S30), and in a case where the captured image data 13 does not satisfy the image evaluation reference 41, the first evaluation unit 32*a* performs the inappropriateness evaluation (NO in step S30).

In the case of YES in step S30, the first evaluation unit 32*a* performs the accompanying image information evaluation (building specifying possibility evaluation, imaging date and time presence and absence evaluation, and image editing history presence and absence evaluation) for evaluating whether or not the captured image data 13 satisfies the accompanying image information evaluation reference 42, as illustrated in FIG. 6 described above (step S31, which corresponds to a first evaluation step of the present invention). In this example, the image evaluation is executed prior to the accompanying image information evaluation, but an order of the execution may be reversed.

Through the building specifying possibility evaluation, the captured image data 13 with which the building specifying unit 31 cannot specify the building 9 is prevented from being registered as the inspection image data 14 in the database 16. Further, through the imaging date and time presence and absence evaluation, the captured image data 13 of which imaging date and time is unclear is prevented from being registered as the inspection image data 14 in the database 16. Further, through the image editing history presence and absence evaluation, the edited captured image data 13 is prevented from being registered as the inspection image data 14 in the database 16. The first evaluation unit 32*a* makes the appropriateness evaluation in a case where the captured image data 13 satisfies the accompanying image information evaluation reference 42 (YES in step S32), and makes the inappropriateness evaluation in a case where the captured image data 13 does not satisfy the accompanying image information evaluation reference 42 (NO in step S32).

In a case where the first evaluation unit 32*a* makes an inappropriateness evaluation in any one of the image evaluation or the accompanying image information evaluation (NO in step S30 or S32), the data cleansing unit 32 deletes the captured image data 13 input from the acquisition unit 30 and stops the registration in the database 16 (step S33).

On the other hand, in a case where the first evaluation unit 32*a* performs the appropriateness evaluation in both the image evaluation and the accompanying image information evaluation (YES in steps S30 and S32), the data cleansing unit 32 outputs the captured image data 13 input from the acquisition unit 30 to the registration unit 35.

The registration unit 35 that has received the captured image data 13 from the data cleansing unit 32 uses the captured image data 13 as inspection image data 14 obtained by imaging the building 9 specified by the building specifying unit 31. The registration unit 35 registers the inspection image information 38 including, for example, the inspection image data 14, and the building information input from the building specifying unit 31 in the database 16 (step S34, which corresponds to a registration step of the present invention). Accordingly, it is possible to register only the captured image data 13 evaluated as satisfying the reference for the inspection image data 14 among the pieces of captured image data 13 acquired from the imaging terminal 12 in the database 16. As a result, the captured image data 13 acquired from the imaging terminal 12 of the ordinary person can be used as the inspection image data 14 for management of the building 9.

After the inspection image information 38 is registered in the database 16, the administrator of the image registration system 10 registers the relevant information 39 illustrated in FIG. 2 described above in the database 16, as necessary. The relevant information 39 can also be used for management of the building 9 together with the above-described inspection image data 14.

[Effect of First Embodiment]

As described above, in the image registration system 10 (image registration device 18) according to the first embodiment, it is possible to acquire the inspection image data 14 (the captured image data 13) that can be used for management of the building 9 from the imaging terminal 12 of the ordinary person and register the inspection image data 14 in the database 16 by evaluating whether or not the captured image data 13 acquired from the imaging terminal 12 satisfies the reference for the inspection image data 14. Further, since the captured image data 13 that does not satisfy the reference for the inspection image data 14 among the pieces of captured image data 13 acquired from the imaging terminal 12 is not registered in the database 16, it is possible to suppress the number of pieces of inspection image data 14 that are registered in the database 16.

[Image Registration System of Second Embodiment]

Figure 8:
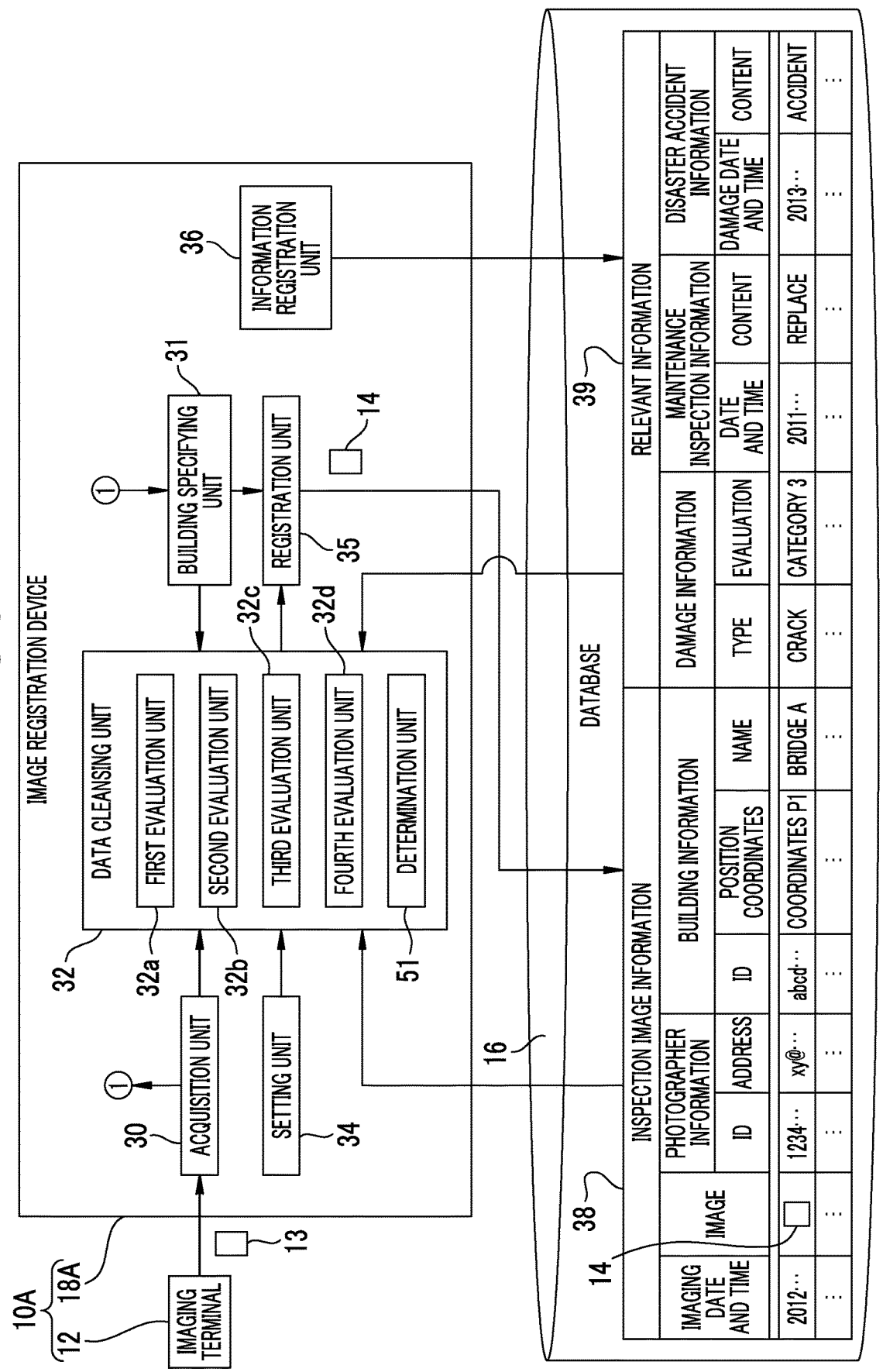
FIG. 8 is a block diagram illustrating a configuration of an image registration system according to a second embodiment.

Next, the image registration system 10A according to the second embodiment of the present invention will be described with reference to FIG. 8. FIG. 8 is a block diagram illustrating a configuration of the image registration system 10A of the second embodiment. In the image registration system 10A, in a case where the first evaluation unit 32*a* makes appropriateness evaluation of the captured image data 13, comparison and evaluation of the captured image data 13 and various database information registered in the database 16 are performed, and it is determined whether or not the captured image data 13 is registered as the inspection image data 14 in the database 16. The database information described herein includes inspection image information 38 (inspection image data 14) and relevant information 39.

The image registration system 10A of the second embodiment has basically the same configuration as that of the image registration system 10 of the first embodiment except that a second evaluation unit 32*b*, a third evaluation unit 32*c*, a fourth evaluation unit 32*d*, and a determination unit 51 are included in the data cleansing unit 32 of the image registration device 18A. Therefore, functions and configurations that are the same as those of the first embodiment are denoted with the same reference numerals, and description thereof will be omitted.

In the case where the first evaluation unit 32*a* makes appropriateness evaluation of the captured image data 13, the determination unit 51 acquires the above-described building information from the building specifying unit 31, and determines whether or not the inspection image data 14 for the building 9 specified by the building specifying unit 31 (the building 9 imaged in the captured image data 13) has been registered in the database 16 on the basis of the building information. For example, the determination unit 51 determines whether or not the inspection image data 14 for the building 9 specified by the building specifying unit 31 has been registered in the database 16 on the basis of whether or not the inspection image information 38 including the ID of the building 9 of the building information is registered in the database 16. A determination method in the determination unit 51 is not limited to the above-described method. Hereinafter, in the second embodiment, the "inspection image data 14 for the building 9 specified by the building specifying unit 31" is simply referred to as "existing inspection image data 14".

The second evaluation unit 32*b*, the third evaluation unit 32*c*, and the fourth evaluation unit 32*d* perform the comparison and evaluation on the captured image data 13 and the database information registered in the database 16 in a case where the first evaluation unit 32*a* makes appropriateness evaluation of the captured image data 13 (evaluation that the captured image data 13 satisfies the above-described reference) and the determination unit 51 determines that the captured image data 13 has been registered. Comparison and evaluation items in a case where the second evaluation unit 32*b*, the third evaluation unit 32*c*, and the fourth evaluation unit 32*d* perform the comparison and evaluation are set by the setting unit 34.

Figure 9:
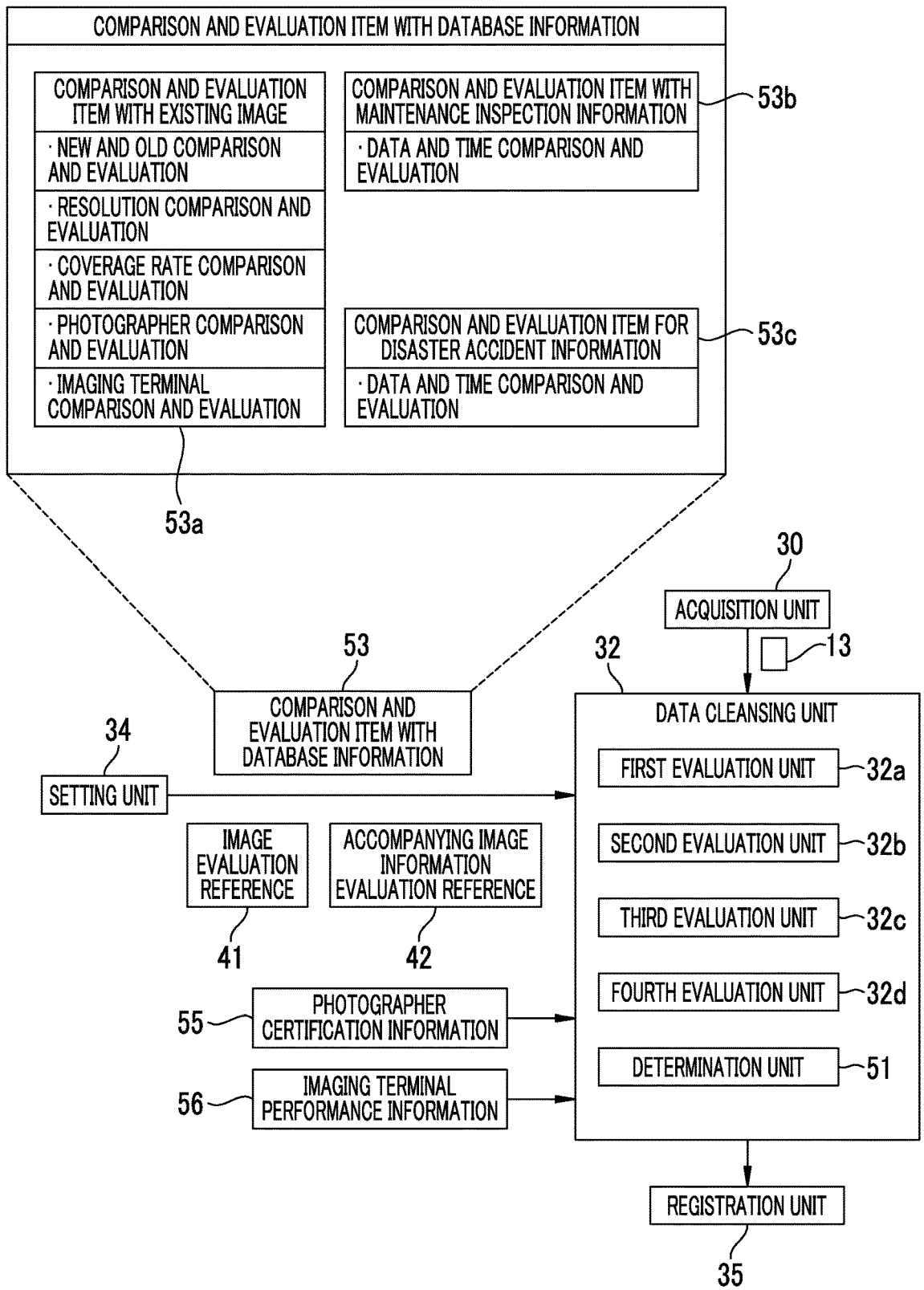
FIG. 9 is an illustrative diagram illustrating comparison and evaluation items of captured image data and database information in a second evaluation unit, a third evaluation unit, and a fourth evaluation unit.

FIG. 9 is an illustrative diagram illustrating comparison and evaluation items between the captured image data 13 and the database information in the second evaluation unit 32*b*, the third evaluation unit 32*c*, and the fourth evaluation unit 32*d*. As illustrated in FIG. 9, the setting unit 34 of the second embodiment receives the input of a comparative item setting operation from the administrator of the image registration system 10, and sets "comparison and evaluation item with database information 53" with respect to the second evaluation unit 32*b*, the third evaluation unit 32*c*, and the fourth evaluation unit 32*d*. A "comparison and evaluation item with existing image 53*a*", a "comparison and evaluation item with maintenance inspection information 53*b*", and a "comparison and evaluation item with disaster accident information 53*c*" are included in the comparison and evaluation item with database information 53.

The "comparison and evaluation item with existing image 53*a*" is set in the second evaluation unit 32*b* by the setting unit 34. In this "comparison and evaluation item with existing image 53*a*", "new and old comparison and evaluation", "resolution comparison and evaluation", "coverage rate comparison and evaluation", "photographer comparison and evaluation", and "imaging terminal comparison and evaluation" are included as comparison and evaluation items between the captured image data 13 and the existing inspection image data 14 (corresponding to the captured image in the database) in the database 16.

In the "old and new comparison and evaluation", the old and new of the imaging date and time of the captured image data 13 and the existing inspection image data 14 are compared and evaluated. Among the captured image data 13 and the existing inspection image data 14, the image data having the new imaging date and time is image data indicating a current state of the building 9, and therefore, the image data having the new imaging date and time is highly evaluated in the comparison and evaluation.

In the "resolution comparison and evaluation", resolution of the captured image data 13 and resolution of the existing inspection image data 14 are compared and evaluated. Among the captured image data 13 and the existing inspection image data 14, a state of details of the building 9 can be confirmed from the image data having the higher resolution, and therefore, the image data having the higher resolution is highly evaluated in the comparison and evaluation.

In the "coverage rate comparison and evaluation", an area (a coverage rate) of the building 9 in the captured image data 13 is compared with an area of the building 9 in the existing inspection image data 14. Among the captured image data 13 and the existing inspection image data 14, a state of details of the building 9 can be confirmed from the image data having a larger area of the building 9, and therefore, the image data having a larger area of the building 9 is highly evaluated in the comparison and evaluation.

In the "photographer comparison and evaluation", comparison and evaluation are performed for superiority and inferiority of the photographer of the captured image data 13 and the photographer of the existing inspection image data 14. Since it is easy to confirm, among the captured image data 13 and the existing inspection image data 14, the state of the building 9 from the image data captured by the photographer who is superior in the imaging skill or the like as compared with the image data captured by the photographer with a poor imaging skill or the like, the image data captured by the photographer who is superior in the imaging skill or the like is highly evaluated in the comparison and evaluation. The superiority or inferiority of this photographer can be determined on the basis of the number of registrations of the inspection image data 14 registered in the database 16 by the photographer. Further, the superiority or inferiority of the photographer can also be determined according to whether or not the photographer is certified by an administrator or the like of the image registration system 10A to be an excellent photographer (including an inspection person). In this case, photographer certification information 55 including a photographer ID of a person who is certified as an excellent photographer by the administrator, for example, is input in advance to the second evaluation unit 32b. The method of performing the comparison for the superiority or inferiority of the photographer is not limited to the above method.

"Imaging terminal comparison and evaluation" means performance of the comparison and evaluation for the superiority or inferiority of imaging performance between the imaging terminal 12 which has captured the captured image data 13 and the imaging terminal 12 which has captured the existing inspection image data 14. Examples of the imaging performance described herein include performance related to image quality or quality of image data, such as the performance (capability) of an optical system or an image sensor, the presence or absence of a camera shake correction function, and image processing performance. Since the image data captured by the imaging terminal 12 having excellent imaging performance among the captured image data 13 and the existing inspection image data 14 has image quality better than that captured by the imaging terminal 12 having poor imaging performance, the image data captured by the imaging terminal 12 having excellent imaging performance is highly evaluated in the comparison and evaluation. In this case, the inspection image information 38 in the database 16 includes model information of the imaging terminal 12. Imaging terminal performance information 56 indicating the imaging performance of the various imaging terminals 12 is input to the second evaluation unit 32b in advance. A method of performing the comparison for the superiority or inferiority of the imaging terminal 12 is not limited to the above method.

The "comparison and evaluation item with maintenance inspection information 53b" is set in the third evaluation unit 32c by the setting unit 34. In the "comparison and evaluation item with maintenance inspection information 53b", comparison and evaluation is performed for a temporal order of the imaging date and time of the captured image data 13 and the "date and time" (see FIG. 8) of the maintenance inspection information of the relevant information 39 of the existing inspection image data 14. This is because it is less necessary for the captured image data 13 captured before the maintenance inspection to be registered in the database 16 as the inspection image data 14 since a state of the building 9 before the maintenance inspection differs from a state of the current building 9 after the maintenance inspection.

The "comparison and evaluation item with disaster accident information 53c" is set in the fourth evaluation unit 32d by the setting unit 34. In the "comparison and evaluation item with disaster accident information 53c", comparison and evaluation is performed for a temporal order of the imaging date and time of the captured image data 13 and the "damage date and time of the disaster accident information" (see FIG. 8) in the relevant information 39 corresponding to the inspection image data 14 in the database 16. This is because it is less necessary for the captured image data 13 captured before the damage occurrence to be registered as the inspection image data 14 in the database 16 since the state of the building 9 before the occurrence of the damage due to the disaster accident differs from a state of the current building 9 damaged by the disaster accident.

<Comparison and Evaluation with Database Information>

Figure 10:
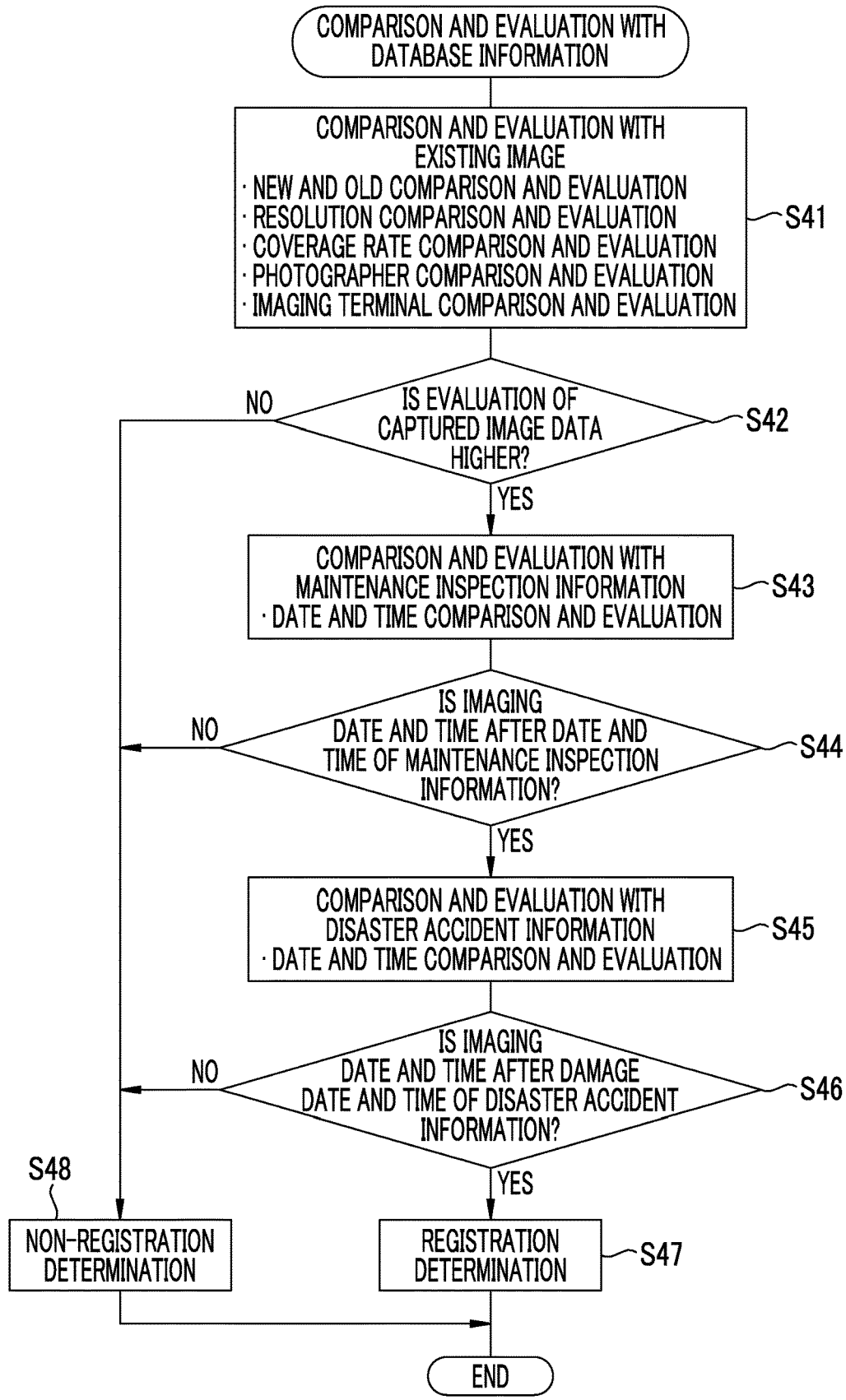
FIG. 10 is a flowchart illustrating a flow of a comparison and evaluation process for the captured image data and the database information in the database in the second evaluation unit, the third evaluation unit, and the fourth evaluation unit.

FIG. 10 is a flowchart illustrating a flow of a process of comparison and evaluation between the captured image data 13 and the database information in the database 16 in the second evaluation unit 32b, the third evaluation unit 32c, and the fourth evaluation unit 32d.

As illustrated in FIG. 10, the second evaluation unit 32b starts "comparison and evaluation with the existing image" on the basis of the "comparison and evaluation item with existing image 53a" set by the setting unit 34 (step S41). The second evaluation unit 32b analyzes the captured image data 13 and the existing inspection image data 14, and performs old and new comparison and evaluation for performing comparison and evaluation for old and new imaging date and time, resolution comparison and evaluation for performing comparison and evaluation for high and low resolution, and coverage rate comparison and evaluation for performing comparison and evaluation for an area of the building 9. The second evaluation unit 32b highly evaluates the image data with new imaging date and time, the image data with higher resolution, and the image data with a larger area of the building 9 among the captured image data 13 and the inspection image data 14.

The second evaluation unit 32b performs photographer comparison and evaluation for performing comparison for superiority or inferiority between the photographer of the captured image data 13 and the photographer of the existing inspection image data 14. For example, the second evaluation unit 32b refers to the database 16, compares the number of registrations of the inspection image data 14 registered in the database 16 by the photographer of the captured image data 13 with the number of registrations of the inspection image data 14 registered in the database 16 by the photographer of the existing inspection image data 14, and evaluates that the photographer with the large number of registrations is superior. Alternatively, in a case where one of the ID of the photographer of the captured image data 13 and the ID of the photographer of the existing inspection image data 14 is registered in the above-described photographer certification information 55, the second evaluation unit 32b evaluates that the photographer of which the ID has been registered is superior. The second evaluation unit 32b highly evaluates one of the captured image data 13 and the existing inspection image data 14 captured by the superior photographer.

Further, on the basis of the "comparison and evaluation item with existing image 53a", the second evaluation unit 32b performs imaging terminal comparison and evaluation for performing comparison for superiority and inferiority of imaging performance of the imaging terminal 12 that has captured the captured image data 13 and the imaging terminal 12 that has captured the existing inspection image data 14. The second evaluation unit 32b performs comparison and evaluation for the superiority and inferiority of the imaging performance of the imaging terminal 12 by referring to the above-described imaging terminal performance information 56 on the basis of model information of the imaging terminal 12 recorded in the accessory information (see FIG. 1) of the tag information of the captured image data 13 and model information of the imaging terminal 12 included in the inspection image information 38 of the existing inspection image data 14. The second evaluation unit 32b highly evaluates one of the captured image data 13 and the existing inspection image data 14 captured by the imaging terminal 12 having high imaging performance.

In a case where the number of comparison and evaluation items in which the captured image data 13 has highly evaluated as compared with the existing inspection image data 14 among the five comparison and evaluation items in the "comparison and evaluation item with existing image 53a" is positive, the second evaluation unit 32b highly evaluates the captured image data 13 as compared with the existing inspection image data 14 in the "comparison and evaluation with existing image" (YES in step S42). On the other hand, in a case where the number of comparison and evaluation items in which the captured image data 13 has highly evaluated as compared with the existing inspection image data 14 is negative, the second evaluation unit 32b low evaluates the captured image data 13 as compared with the existing inspection image data 14 in the "comparison and evaluation with existing image" (NO in step S42).

The second evaluation unit 32b may perform weighting to weight the five comparison and evaluation items described above, and may highly evaluate the captured image data 13 as compared with the existing inspection image data 14 in a case where the total value of the weights of the captured image data 13 becomes greater than that of the existing inspection image data 14. Further, in a case where the captured image data 13 is highly evaluated as compared with the existing inspection image data 14 in all of the five comparison and evaluation items, the second evaluation unit 32b may highly evaluate the captured image data 13 as compared with the existing inspection image data 14. Thus, the "comparison and evaluation with existing image" in the second evaluation unit 32b is completed.

In the case of YES in step S42, the third evaluation unit 32c starts "comparison and evaluation with maintenance inspection information" on the basis of the "comparison and evaluation item with maintenance inspection information 53b" set by setting unit 34 (step S43). The third evaluation unit 32c acquires "imaging date and time" from the tag information of the captured image data 13. Further, the third evaluation unit 32c acquires "date and time" (see FIG. 8) of the maintenance inspection information from the relevant information 39 in the database 16 for the building 9 specified by the building specifying unit 31. The third evaluation unit 32c evaluates whether the imaging date and time of the captured image data 13 is after the "date and time" of the maintenance inspection information of the existing inspection image data 14 (YES in step S44) or before the "date and time" of the maintenance inspection information of the existing inspection image data 14 (NO in step S44). In a case where the maintenance inspection information for the building 9 specified by the building specifying unit 31 is not registered in the database 16, the third evaluation unit 32c evaluates that the imaging date and time of the captured image data 13 is "after". Thus, the "comparison and evaluation with the maintenance inspection information" in the third evaluation unit 32c is completed.

In the case of YES in step S44, the fourth evaluation unit 32d starts comparison and evaluation with the disaster accident information on the basis of the "comparison and evaluation item with disaster accident information 53c" set by the setting unit 34 (step S45). The fourth evaluation unit 32d acquires "imaging date and time" from the tag information of the captured image data 13. Further, the fourth evaluation unit 32d acquires the "damage date and time" (see FIG. 8) of the disaster accident information from the relevant information 39 in the database 16 for the building 9 specified by the building specifying unit 31. The fourth evaluation unit 32d evaluates whether the imaging date and time of the captured image data 13 is after the "damage date and time" of the disaster accident information of the existing inspection image data 14 (YES in step S46) or before the "damage date and time" (NO in step S46). In a case where the disaster accident information for the building 9 specified by the building specifying unit 31 is not registered in the database 16, the fourth evaluation unit 32d evaluates that the imaging date and time of the captured image data 13 is "after". Thus, the "comparison and evaluation with disaster accident information" in the fourth evaluation unit 32d is completed.

Thus, the "comparison and evaluation with database information" is completed. In the case of YES in step S46, the data cleansing unit 32 performs a registration determination indicating that the captured image data 13 is to be registered in the database 16 as the inspection image data 14 (step S47). On the other hand, in the case of NO in any of steps S42, S44, and S46, the data cleansing unit 32 performs a non-registration determination indicating that the captured image data 13 is not to be registered in the database 16 as the inspection image data 14 (step S48).

Referring back to FIG. 8, the data cleansing unit 32 of the second embodiment outputs the captured image data 13 input from the acquisition unit 30 to the registration unit 35 in a case where the data cleansing unit 32 performs the registration determination. On the other hand, the data cleansing unit 32 deletes the captured image data 13 input from the acquisition unit 30 in a case where the data cleansing unit 32 performs the non-registration determination.

[Operation of Image Registration System of Second Embodiment]

Figure 11:
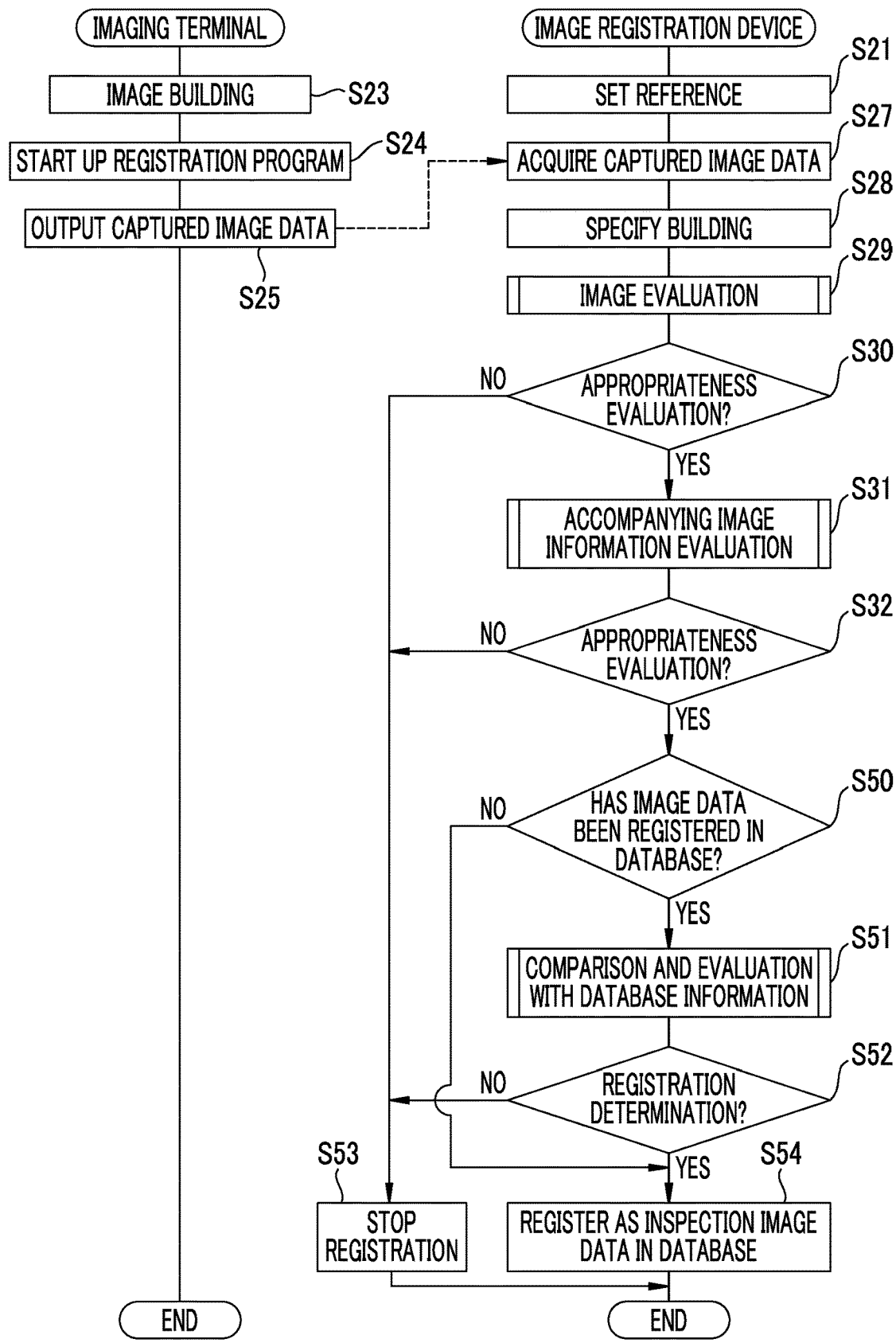
FIG. 11 is a flowchart illustrating a flow of a process of registering inspection image data in a database in the image registration system of the second embodiment.

Next, an operation of the image registration system 10A of the second embodiment will be described with reference to FIG. 11. FIG. 11 is a flowchart illustrating a flow of a process of registering the inspection image data 14 in the database 16 in the image registration system 10A (image registration device 18A) according to the second embodiment (an image registration method of the present invention). Since a flow of processes from step S21 to step S32 is basically the same as that of the first embodiment illustrated in FIG. 7 described above, detailed description thereof will be omitted herein.

In a case where the first evaluation unit 32a makes appropriateness evaluation that the captured image data 13 satisfies the above-described reference (YES in step S32), the determination unit 51 of the image registration device 18A acquires building information (for example, the ID of the building 9) from the building specifying unit 31. The determination unit 51 refers to the database 16 and determines whether the existing inspection image data 14 corresponding to the acquired building information has already been registered in the database 16 (step S50). In a case where the determination unit 51 determines "no" (NO in step S50), the captured image data 13 is output from the data cleansing unit 32 to the registration unit 35, as in the first embodiment described above.

On the other hand, in a case where the determination unit 51 determines that the existing inspection image data 14 has been registered in the database 16 (YES in step S50), the "comparison and evaluation with existing image" in the second evaluation unit 32b, the "comparison and evaluation with maintenance inspection information" in the third evaluation unit 32c, and the "comparison and evaluation with disaster accident information" in the fourth evaluation unit 32d are executed, as illustrated in FIG. 10 described above (step S51).

Through the "comparison and evaluation with the existing image", the captured image data 13 that is inferior to the existing inspection image data 14 in terms of newness (imaging date and time) and quality (resolution, an area of the building 9, a photographer, and imaging performance of the imaging terminal 12) of information is prevented from being registered in the database 16 as the inspection image data 14. Further, through the "comparison and evaluation with maintenance inspection information" and the "comparison and evaluation with disaster accident information", captured image data 13 of the building 9 before the maintenance inspection or before the disaster accident, that is, captured image data 13 which does not indicate a state of the current building 9 is prevented from being registered in the database 16 as the inspection image data 14.

In a case where the data cleansing unit 32 makes the non-registration determination (NO in step S52), the data cleansing unit 32 deletes the captured image data 13 input from the acquisition unit 30 and stops the registration in the database 16, as in the first embodiment illustrated in FIG. 7 (step S53).

On the other hand, the data cleansing unit 32 outputs the captured image data 13 input from the acquisition unit 30 to the registration unit 35 in a case where the data cleansing unit 32 makes the registration determination (YES in step S52) or in the case of NO in step S50 described above. Accordingly, the registration unit 35 registers the captured image data 13 in the database 16 as new inspection image data 14 (step S54).

[Effect of Second Embodiment]

As described above, in the image registration system 10A according to the second embodiment, in a case where the first evaluation unit 32a makes appropriateness evaluation of the captured image data 13, moreover, the comparison and evaluation of the captured image data 13 and various database information registered in the database 16 is performed. Thus, the captured image data 13 that is inferior to the existing inspection image data 14 in terms of newness or quality of information, or the captured image data 13 of the building 9 before the maintenance inspection or before disaster accident is prevented from being registered in the database 16 as the inspection image data 14. As a result, it is possible to suppress the number of pieces of inspection image data 14 that are registered in the database 16.

[Image Registration System of Third Embodiment]

Figure 12:
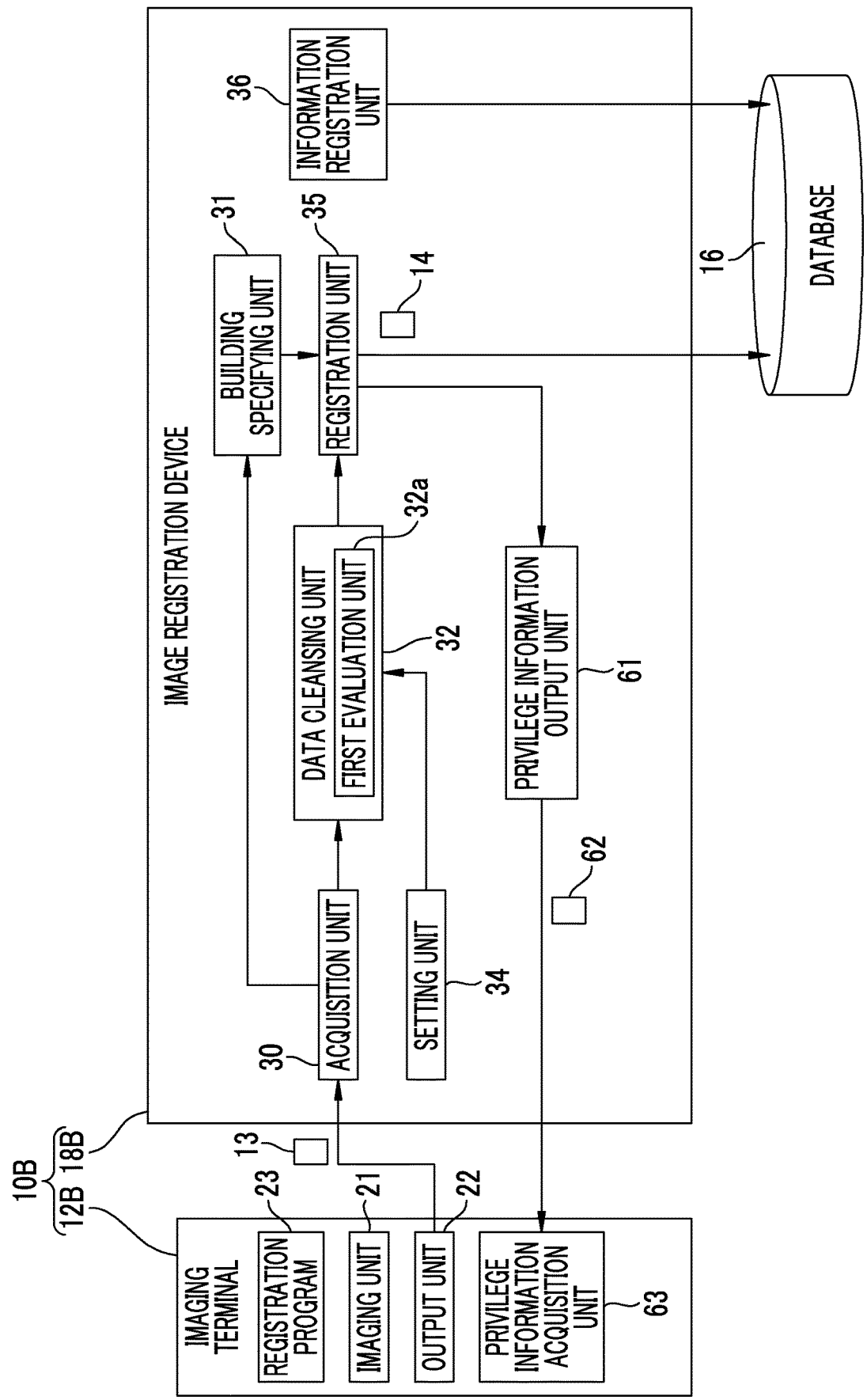
FIG. 12 is a block diagram illustrating a configuration of an image registration system according to a third embodiment.

Next, an image registration system 10B according to a third embodiment of the present invention will be described with reference to FIG. 12. FIG. 12 is a block diagram illustrating a configuration of the image registration system 10B of the third embodiment. In the image registration system 10B, in a case where the captured image data 13 is registered in the database 16 as inspection image data 14, the privilege information 62 is imparted to the imaging terminal 12 that is a transmission source of the captured image data 13.

The image registration system 10B of the third embodiment has basically the same configuration as the image registration system 10 of the first embodiment except that the image registration device 18B includes a privilege information output unit 61, and the imaging terminal 12B includes a privilege information acquisition unit 63. Therefore, functions and configurations that are the same as those of the first embodiment are denoted with the same reference numerals, and description thereof will be omitted.

In a case where the registration unit 35 registers the captured image data 13 in the database 16 as the inspection image data 14, the privilege information output unit 61 of the image registration device 18B outputs privilege information 62 indicating a privilege to be imparted to the user (the photographer of the captured image data 13) of the imaging terminal 12 to the imaging terminal 12 that is an output source (a transmission source) of the captured image data 13. For example, on the basis of the e-mail address included in the accessory information (see FIG. 1) of the tag information of the captured image data 13, the privilege information output unit 61 of this example transmits an e-mail to which the privilege information 62 has been attached, to this e-mail address. A method of outputting the privilege information 62 to the imaging terminal 12 that is the output source of the captured image data 13 is not particularly limited.

Examples of the privilege information 62 include an electronic coupon that can be used to purchase various products or to receive services, electronic money that is used for electronic commerce, a product that can be distributed to the imaging terminal 12 such as application program, and means for access to a website on the Internet on which generally non-public information is posted, but the present invention is not limited thereto.

The privilege information acquisition unit 63 of the imaging terminal 12B is a communication interface that can be communicatably wiredly or wirelessly connected to the image registration device 18B, and acquires the privilege information 62 output from the privilege information output unit 61. The privilege information acquisition unit 63 may be a communication interface integrated with the output unit 22 described above.

Figure 13:
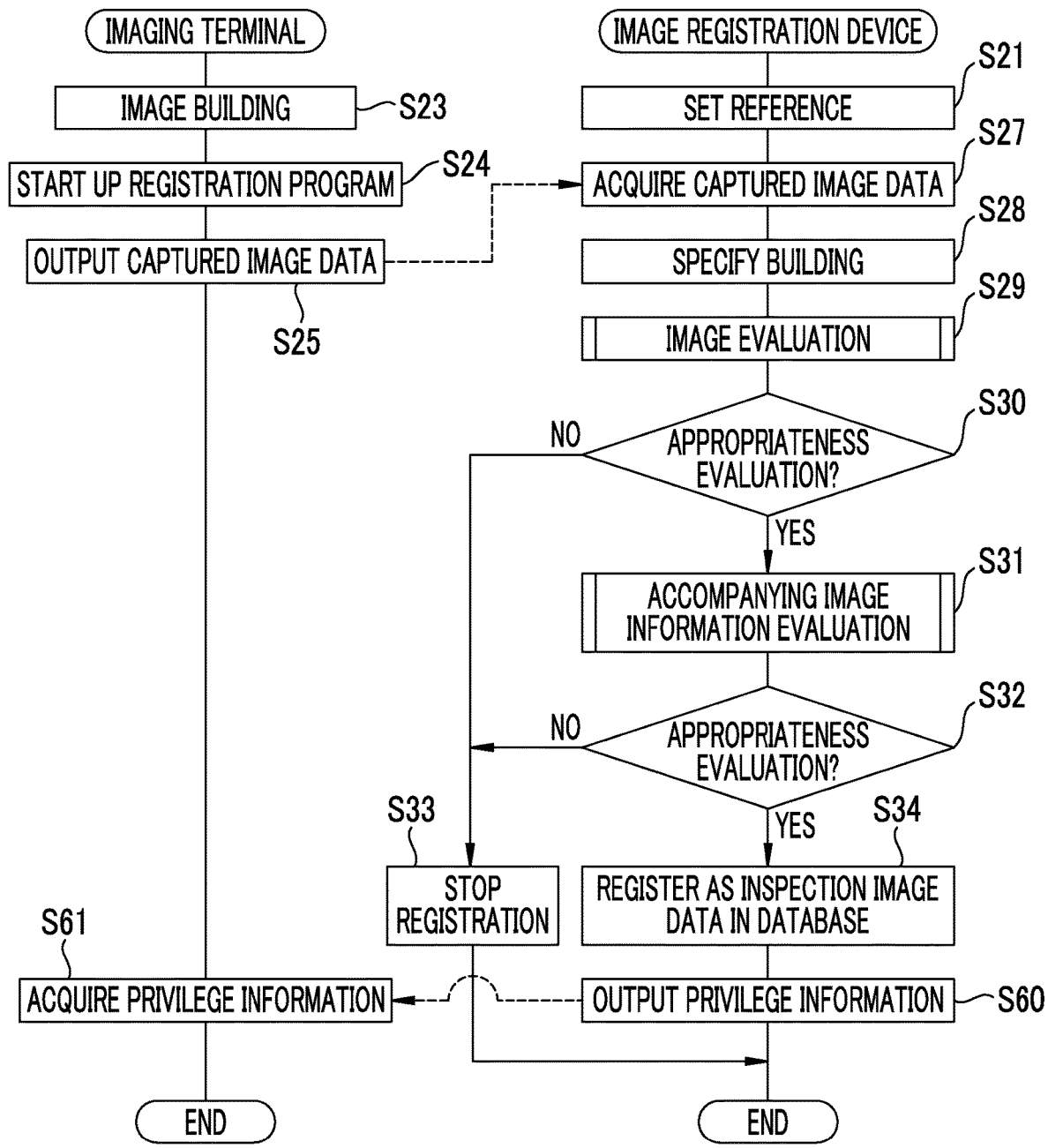
FIG. 13 is a flowchart illustrating a flow of a process of outputting privilege information to an imaging terminal in the image registration system of the third embodiment.

Next, an operation of the image registration system 10B of the third embodiment will be described with reference to FIG. 13. FIG. 13 is a flowchart illustrating a flow of an output process of the privilege information 62 to the imaging terminal 12 in the image registration system 10B (image registration device 18B) according to the third embodiment. Since a flow of processes from step S21 to step S34 is basically the same as that of the first embodiment illustrated in FIG. 7 described above, detailed description thereof will be omitted herein.

In the case where the registration unit 35 registers the captured image data 13 in the database 16 as the inspection image data 14 in step S34, the privilege information output unit 61 transmits an e-mail to which the privilege information 62 has been attached, to this e-mail address on the basis of the e-mail address included in the accessory information (see FIG. 1) of the tag information of the captured image data 13. Accordingly, the privilege information 62 is output from the image registration device 18B to the imaging terminal 12 that is the output source of the captured image data 13 (step S60).

In the privilege information acquisition unit 63 of the imaging terminal 12B, the privilege information 62 output from the privilege information output unit 61 is acquired (step S61). As a result, the user of the imaging terminal 12 can acquire the privilege information 62.

[Effect of Third Embodiment]

As described above, in the image registration system 10B according to the third embodiment, in a case where the captured image data 13 is registered as the inspection image data 14 in the database 16, the privilege information 62 is output to the imaging terminal 12 which is an output source of the captured image data 13, and therefore, the user (ordinary person) of the imaging terminal 12 can be requested to perform imaging of the building 9 in which the damage D occurs, and outputting of the captured image data 13 to the image registration device 18B.

[Modification Example of Third Embodiment]

In the image registration system 10A of the second embodiment, the privilege information 62 may be output to the imaging terminal 12 that is an output source of the captured image data 13 registered in the database 16, as in the third embodiment.

[Image Registration System of Fourth Embodiment]

Figure 14:
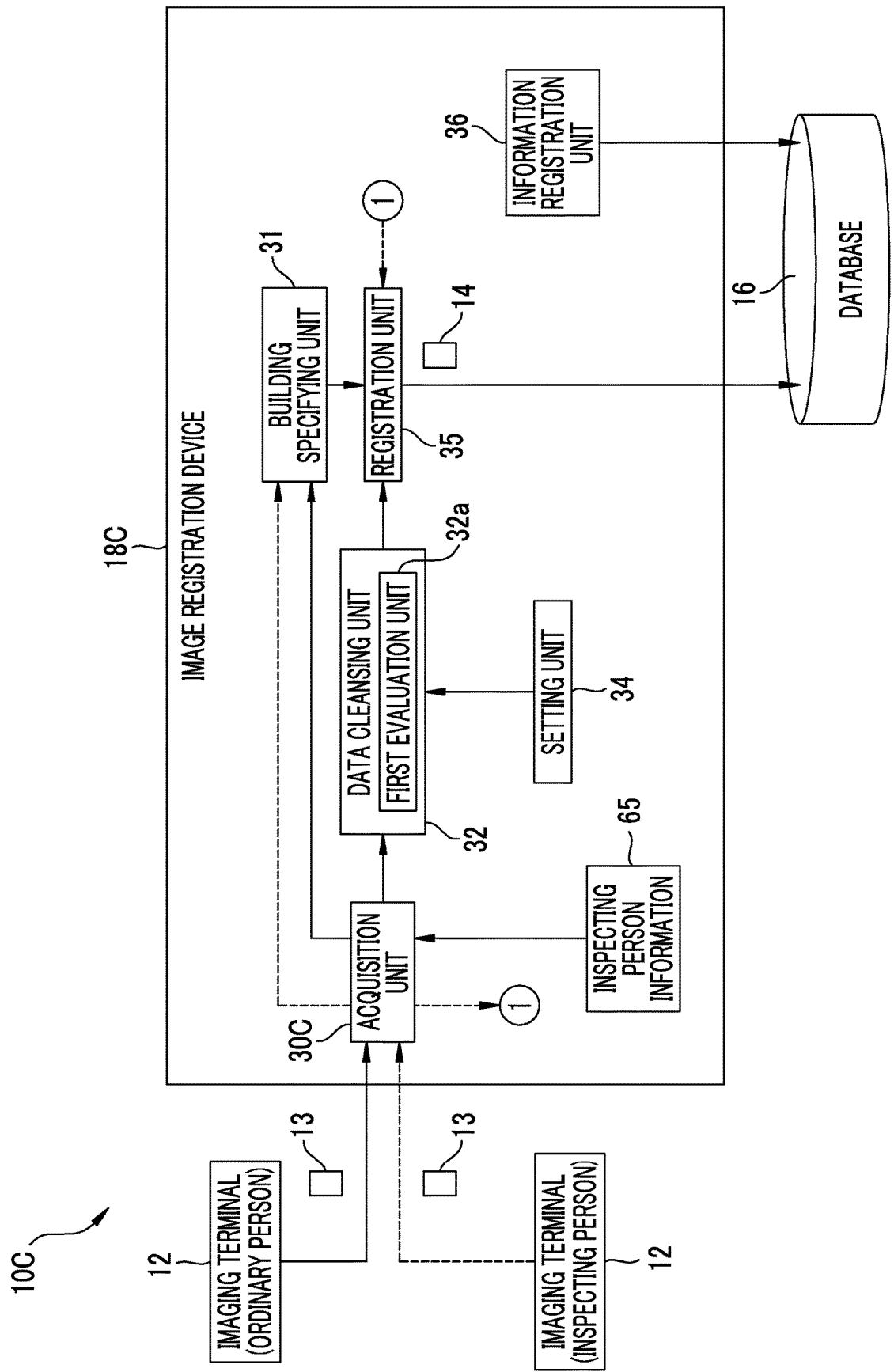
FIG. 14 is a block diagram illustrating a configuration of an image registration system according to a fourth embodiment.

Next, an image registration system 10C according to a fourth embodiment of the present invention will be described with reference to FIG. 14. FIG. 14 is a block diagram illustrating a configuration of the image registration system 10C of the fourth embodiment. In the image registration systems 10, 10A, and 10B according to the above embodiments, the captured image data 13 acquired from the imaging terminal 12 owned by the ordinary person is registered in the database 16 as inspection image data 14. On the other hand, in the image registration system 10C according to the fourth embodiment, the captured image data 13 acquired from the imaging terminal 12 owned by an inspecting person (corresponding to a specific user of the present invention) is registered in the database 16 as the inspection image data 14, in addition to the imaging terminal 12 owned by an ordinary person.

The image registration system 10C of the fourth embodiment has basically the same configuration as that of the image registration system 10 of the first embodiment except that the image registration device 18C includes an acquisition unit 30C. Therefore, functions and configurations that are the same as those of the first embodiment are denoted with the same reference numerals, and description thereof will be omitted.

In a case where the acquisition unit 30C has acquired the captured image data 13 from the imaging terminal 12, the acquisition unit 30C determines whether or not the captured image data 13 is the captured image data 13 captured by the imaging terminal 12 owned by the inspecting person. For example, the acquisition unit 30C acquires inspecting person information 65 including an ID of a known inspecting person, compares this inspecting person information 65 with the ID of the photographer included in the accessory information (see FIG. 1) of the tag information of the captured image data 13 acquired from the imaging terminal 12 to determine whether the captured image data 13 has been captured by the imaging terminal 12 owned by the inspecting person. A method of determining whether or not the captured image data 13 has been captured by the imaging terminal 12 owned by the inspecting person is not limited to the above-described method.

In a case where the captured image data 13 acquired from the imaging terminal 12 is the captured image data 13 captured by the imaging terminal 12 owned by the inspecting person, the acquisition unit 30C outputs the captured image data 13 as it is to the registration unit 35 and outputs "position information" and "imaging direction" included in the tag information of the captured image data 13 to the building specifying unit 31 (indicated by a dotted line in the drawing).

Since the captured image data 13 captured by the imaging terminal 12 of the inspecting person having expertise is image data corresponding to the inspection image data 14 itself, the captured image data 13 can be registered in the database 16 by the registration unit 35 without passing through the data cleansing unit 32. Damage information or the like may be added to the captured image data 13 by the inspecting person.

On the other hand, in a case where the captured image data 13 acquired from the imaging terminal 12 is the captured image data 13 captured by the imaging terminal 12 owned by the ordinary person, the same process as that in the first embodiment is executed.

[Effect of Fourth Embodiment]

As described above, in the image registration system 10C according to the fourth embodiment, since the captured image data 13 acquired from the imaging terminal 12 owned by the inspecting person is registered as the inspection image data 14 as it is in the database 16, the evaluation process in the data cleansing unit 32 can be omitted, and a calculation load of the image registration device 18C can be reduced.

[Modification Example of Fourth Embodiment]

The captured image data 13 acquired from the imaging terminal 12 owned by a photographer (corresponding to a specific user of the present invention) certified by the administrator or the like of the image registration system 10C, in addition to the inspecting person, may be registered in the database 16 as the inspection image data 14 as it is. In this case, the acquisition unit 30C acquires the photographer certification information 55 illustrated in FIG. 9 described above instead of the inspecting person information 65. Further, in the image registration systems 10A and 10B of the second embodiment and the third embodiment, the captured image data 13 acquired from the imaging terminal 12 owned by the inspecting person or the like may be registered in the database 16 as the inspection image data 14 as it is, as in the fourth embodiment.

[Others]

Although the image evaluation reference 41 and the accompanying image information evaluation reference 42 illustrated in FIG. 4 described above are illustrated as examples of the "predetermined reference" in a case where the first evaluation unit 32a evaluates the captured image data 13 in each of the above-described embodiments, content of the image evaluation reference 41 and the accompanying image information evaluation reference 42 may be appropriately changed, increased or decreased as long as the content is content with which it can be evaluated that the captured image data 13 can be used as the inspection image data 14. Further, any one of the image evaluation reference 41 and the accompanying image information evaluation reference 42 may be deleted.

Although the comparison and evaluation are performed for the captured image data 13 and the database information by the second evaluation unit 32b, the third evaluation unit 32c, and the fourth evaluation unit 32d as illustrated in FIG. 9 described above in the second embodiment, it is not necessary for all of the second evaluation unit 32b, the third evaluation unit 32c, and the fourth evaluation unit 32d to be included, and the comparison and evaluation may be performed by at least one of the second evaluation unit 32b, the third evaluation unit 32c, and the fourth evaluation unit 32d. Further, the content of the evaluation items of the "comparison and evaluation item with database information 53" illustrated in FIG. 9 described above may also be appropriately changed, increased or decreased.

Although the database 16 is provided separately from the image registration device 18 or the like in each of the above embodiments, the database 16 may be embedded into the image registration device 18 or the like.

In each of the above embodiments, the case where the building 9 is an example of the inspection target of the present invention has been described. However, for example, an object that can be a target of various inspections (including management), such as a natural object such as a tree, an artificial object other than a building, or a site at which disaster or accident such as mudslide occurs, are also included in the inspection target of the present invention.

A program for causing a computer to function as the image registration device described in each of the above embodiments may be recorded on a compact disk read only memory (CD-ROM), a magnetic disk, or other computer readable media (non-transitory tangible information storage media), and the program can be provided through the information storage medium. Further, the program can be provided as a download service using a communication network such as the Internet, instead of an aspect in which the program is stored in the information storage medium and provided.

EXPLANATION OF REFERENCES

9: Building
10, 10A, 10B, 10C: image registration system
12, 12B: imaging terminal
13: captured image data
14: inspection image data
16: database
18, 18A, 18B, 18C: image registration device
30, 30C: acquisition unit
32a: first evaluation unit
32b: second evaluation unit
32c: third evaluation unit
32d: fourth evaluation unit
35: registration unit
61: privilege information output unit
62: privilege information

What is claimed is:

1. An image registration device that registers a captured image of an inspection target acquired from an imaging terminal which images the inspection target in a database, the image registration device comprising:
    an acquisition unit that acquires the captured image and an imaging position of the captured image from the imaging terminal;
    an inspection target specifying unit that specifies the inspection target that is an imaging target of the imaging terminal on a basis of the imaging position acquired by the acquisition unit;
    a first evaluation unit that evaluates whether or not the captured image acquired by the acquisition unit satisfies a predetermined reference for an image that is used for management of the inspection target;
    a registration unit that registers the captured image evaluated as satisfying the predetermined reference by the first evaluation unit in the database in association with information indicating the inspection target specified by the inspection target specifying unit; and
    a second evaluation unit that, in a case where the first evaluation unit evaluates that the captured image satisfies the predetermined reference and in a case where a captured image of the inspection target specified by the inspection target specifying unit is registered in the database, performs comparison and evaluation on the captured image in the database and the captured image evaluated as satisfying the predetermined reference on a basis of a predetermined comparison and evaluation item, wherein
    the registration unit registers the captured image evaluated as satisfying the predetermined reference in the database in a case where an evaluation value regarding the predetermined comparison and evaluation item of the captured image evaluated as satisfying the predetermined reference is higher than that of the captured image in the database in the comparison and evaluation of the second evaluation unit,
    the predetermined reference includes at least one of
        a damage type evaluation reference that corresponds to a reference for evaluating whether or not a damage occurring in the inspection target imaged in the captured image is a predetermined specific damage;
        a detailed evaluation reference that corresponds to a reference for evaluating whether or not the captured image data has an appropriate resolution determined for each type of damage in advance; and
        an absence of image editing history reference that corresponds to a reference for indicating that an editing date and time of the captured image is not registered in tag information of the captured image, and
    the comparison and evaluation item includes at least one of a resolution comparison and evaluation item that corresponds to a comparison and evaluation between a resolution of the captured image and a resolution of the captured image of the inspection target registered in the database;

a coverage rate comparison and evaluation item that corresponds to a comparison and evaluation between an area of the inspection target in the captured image and an area of the inspection target in the captured image of the inspection target registered in the database;

a photographer comparison and evaluation item that corresponds to a comparison and evaluation for superiority of a photographer between a photographer that captures the captured image and a photographer that captured the captured image of the inspection target registered in the database;

an imaging terminal comparison and evaluation item that corresponds to a comparison and evaluation for superiority of an imaging performance between an imaging terminal that captured the captured image and an imaging terminal that captured the captured image of the inspection target registered in the database;

a comparison and evaluation item with disaster accident information that corresponds to a comparison and evaluation for a temporal order between an imaging date and time of the captured image and a damage date and time of disaster accident information regarding the captured image of the inspection target registered in the database;

an old and new comparison and evaluation item that corresponds to a comparison and evaluation for an old and new between an imaging date and time of the captured image and an imaging date and time of the captured image of the inspection target registered in the database; and a comparison and evaluation item with maintenance inspection information that corresponds to a comparison and evaluation for a temporal order between an imaging date and time of the captured image and a date and time of a maintenance inspection information of a relevant information regarding the captured image of the inspection target registered in the database.

2. The image registration device according to claim 1, wherein
the registration unit registers the captured image evaluated as satisfying the predetermined reference by the first evaluation unit in the database in association with information including imaging date and time and the imaging position of the captured image.

3. The image registration device according to claim 1, wherein
the acquisition unit further acquires imaging date and time of the captured image from the imaging terminal,
a date and time at which maintenance inspection of the inspection target has been performed is registered in the database for each inspection target,
the image registration device further comprises a third evaluation unit that acquires the date and time of the maintenance inspection for the inspection target from the database in a case where the first evaluation unit evaluates that the captured image satisfies the predetermined reference, and in a case where a captured image of the inspection target specified by the inspection target specifying unit is registered in the database, and evaluates whether or not the imaging date and time acquired by the acquisition unit is after the acquired date and time of the maintenance inspection, and
the registration unit registers the captured image evaluated as satisfying the predetermined reference in the database in a case where the third evaluation unit evaluates that the imaging date and time is after the date and time of the maintenance inspection.

4. The image registration device according to claim 2, wherein
the acquisition unit further acquires imaging date and time of the captured image from the imaging terminal,
a date and time at which maintenance inspection of the inspection target has been performed is registered in the database for each inspection target,
the image registration device further comprises a third evaluation unit that acquires the date and time of the maintenance inspection for the inspection target from the database in a case where the first evaluation unit evaluates that the captured image satisfies the predetermined reference, and in a case where a captured image of the inspection target specified by the inspection target specifying unit is registered in the database, and evaluates whether or not the imaging date and time acquired by the acquisition unit is after the acquired date and time of the maintenance inspection, and
the registration unit registers the captured image evaluated as satisfying the predetermined reference in the database in a case where the third evaluation unit evaluates that the imaging date and time is after the date and time of the maintenance inspection.

5. The image registration device according to claim 1, wherein
the acquisition unit further acquires the imaging date and time of the captured image from the imaging terminal,
in a case where damage occurs in the inspection target, a damage date and time which is a date and time at which the damage of the inspection target has occurred is registered in the database,
the image registration device further comprises a fourth evaluation unit that acquires the damage date and time in the inspection target from the database in a case where the first evaluation unit evaluates that the captured image satisfies the predetermined reference, and in a case where a captured image of the inspection target specified by the inspection target specifying unit is registered in the database, and evaluates whether or not the imaging date and time acquired by the acquisition unit is after the acquired damage date and time, and
in a case where the fourth evaluation unit evaluates that the imaging date and time is after the damage date and time, the registration unit registers the captured image evaluated as satisfying the predetermined reference in the database.

6. The image registration device according to claim 2, wherein
the acquisition unit further acquires the imaging date and time of the captured image from the imaging terminal,
in a case where damage occurs in the inspection target, a damage date and time which is a date and time at which the damage of the inspection target has occurred is registered in the database,
the image registration device further comprises a fourth evaluation unit that acquires the damage date and time in the inspection target from the database in a case where the first evaluation unit evaluates that the captured image satisfies the predetermined reference, and in a case where a captured image of the inspection target specified by the inspection target specifying unit is registered in the database, and evaluates whether or not the imaging date and time acquired by the acquisition unit is after the acquired damage date and time, and in a case where the fourth evaluation unit evaluates that the imaging date and time is after the damage date and time, the registration unit registers the captured image evaluated as satisfying the predetermined reference in the database.

7. The image registration device according to claim 3, wherein the acquisition unit further acquires the imaging date and time of the captured image from the imaging terminal, in a case where damage occurs in the inspection target, a damage date and time which is a date and time at which the damage of the inspection target has occurred is registered in the database, the image registration device further comprises a fourth evaluation unit that acquires the damage date and time in the inspection target from the database in a case where the first evaluation unit evaluates that the captured image satisfies the predetermined reference, and in a case where a captured image of the inspection target specified by the inspection target specifying unit is registered in the database, and evaluates whether or not the imaging date and time acquired by the acquisition unit is after the acquired damage date and time, and in a case where the fourth evaluation unit evaluates that the imaging date and time is after the damage date and time, the registration unit registers the captured image evaluated as satisfying the predetermined reference in the database.

8. The image registration device according to claim 4, wherein the acquisition unit further acquires the imaging date and time of the captured image from the imaging terminal, in a case where damage occurs in the inspection target, a damage date and time which is a date and time at which the damage of the inspection target has occurred is registered in the database, the image registration device further comprises a fourth evaluation unit that acquires the damage date and time in the inspection target from the database in a case where the first evaluation unit evaluates that the captured image satisfies the predetermined reference, and in a case where a captured image of the inspection target specified by the inspection target specifying unit is registered in the database, and evaluates whether or not the imaging date and time acquired by the acquisition unit is after the acquired damage date and time, and in a case where the fourth evaluation unit evaluates that the imaging date and time is after the damage date and time, the registration unit registers the captured image evaluated as satisfying the predetermined reference in the database.

9. The image registration device according to claim 1, wherein the predetermined reference includes a predetermined reference for image quality of a captured image, and the first evaluation unit evaluates whether or not image quality of the captured image satisfies the predetermined reference for image quality on a basis of a result of analyzing the image quality of the captured image.

10. The image registration device according to claim 2, wherein the predetermined reference includes a predetermined reference for image quality of a captured image, and the first evaluation unit evaluates whether or not image quality of the captured image satisfies the predetermined reference for image quality on a basis of a result of analyzing the image quality of the captured image.

11. The image registration device according to claim 3, wherein the predetermined reference includes a predetermined reference for image quality of a captured image, and the first evaluation unit evaluates whether or not image quality of the captured image satisfies the predetermined reference for image quality on a basis of a result of analyzing the image quality of the captured image.

12. The image registration device according to according to claim 1, wherein the predetermined reference includes the fact that the captured image is an image obtained by imaging a specific type of damage that has occurred in the inspection target, and the first evaluation unit evaluates whether or not the captured image satisfies the predetermined reference on a basis of a result of analyzing whether or not the image of the specific type of damage is included in the captured image.

13. The image registration device according to according to claim 1, wherein the predetermined reference includes the fact that specific information for use in specifying of the inspection target in the inspection target specifying unit is added to the captured image, and the first evaluation unit evaluates whether or not the captured image satisfies the predetermined reference on a basis of whether or not the specific information is added to the captured image.

14. The image registration device according to according to claim 1, wherein the predetermined reference includes the fact that an imaging date and time of the captured image can be specified, and the first evaluation unit evaluates whether or not the captured image satisfies the predetermined reference on a basis of whether or not the imaging date and time of the captured image can be specified.

15. The image registration device according to according to claim 1, wherein the predetermined reference includes the fact that the captured image is an image before an editing process, and the first evaluation unit evaluates whether or not the captured image satisfies the predetermined reference on a basis of whether or not the captured image is an image before the editing process.

16. The image registration device according to according to claim 1, further comprising:

a privilege information output unit that outputs privilege information indicating a privilege to be imparted to a user of the imaging terminal to the imaging terminal that is an output source of the captured image in a case where the registration unit registers the captured image in the database.

17. The image registration device according to according to claim 1, wherein
in a case where the acquisition unit acquires the captured image from the imaging terminal of a predetermined specific user, the evaluation in the first evaluation unit is stopped, and the captured image is registered in the database by the registration unit.

18. An image registration system comprising:
an imaging terminal that images an inspection target, and the image registration device according to according to claim 1, wherein
the imaging terminal comprises a terminal side output unit that outputs a captured image of the inspection target and an imaging position of the captured image to the image registration device.

19. An imaging terminal constituting the image registration system according to claim 18.

20. An image registration method that registers a captured image of an inspection target acquired from an imaging terminal which images the inspection target in a database, the method comprising:
an acquisition step of acquiring the captured image and an imaging position of the captured image from the imaging terminal;
an inspection target specifying step of specifying the inspection target that is an imaging target of the imaging terminal on a basis of the imaging position acquired in the acquisition step;
a first evaluation step of evaluating whether or not the captured image acquired in the acquisition step satisfies a predetermined reference for an image that is used for management of the inspection target;
a registration step of registering the captured image evaluated as satisfying the predetermined reference in the first evaluation step in the database in association with information indicating the inspection target specified in the inspection target specifying step; and
a second evaluation step of comparing and evaluating, in a case where it is evaluated that the captured image satisfies the predetermined reference in the first evaluation step and in a case where a captured image of the inspection target specified by the inspection target specifying step is registered in the database, the captured image in the database and the captured image evaluated as satisfying the predetermined reference on a basis of a predetermined comparison and evaluation item; wherein
the registration step is step of registering the captured image evaluated as satisfying the predetermined reference in the database, in a case where an evaluation value regarding the predetermined comparison and evaluation item of the captured image evaluated as satisfying the predetermined reference is higher than that of the captured image in the database in the comparing and evaluating of the second evaluation step,
the predetermined reference includes at least one of
a damage type evaluation reference that corresponds to a reference for evaluating whether or not a damage occurring in the inspection target imaged in the captured image is a predetermined specific damage;
a detailed evaluation reference that corresponds to a reference for evaluating whether or not the captured image data has an appropriate resolution determined for each type of damage in advance; and
an absence of image editing history reference that corresponds to a reference for indicating that an editing date and time of the captured image is not registered in tag information of the captured image, and
the comparison and evaluation item includes at least one of
a resolution comparison and evaluation item that corresponds to a comparison and evaluation between a resolution of the captured image and a resolution of the captured image of the inspection target registered in the database;
a coverage rate comparison and evaluation item that corresponds to a comparison and evaluation between an area of the inspection target in the captured image and an area of the inspection target in the captured image of the inspection target registered in the database;
a photographer comparison and evaluation item that corresponds to a comparison and evaluation for superiority of a photographer between a photographer that captures the captured image and a photographer that captured the captured image of the inspection target registered in the database;
an imaging terminal comparison and evaluation item that corresponds to a comparison and evaluation for superiority of an imaging performance between an imaging terminal that captured the captured image and an imaging terminal that captured the captured image of the inspection target registered in the database;
a comparison and evaluation item with disaster accident information that corresponds to a comparison and evaluation for a temporal order between an imaging date and time of the captured image and a damage date and time of disaster accident information regarding the captured image of the inspection target registered in the database;
an old and new comparison and evaluation item that corresponds to a comparison and evaluation for an old and new between an imaging date and time of the captured image and an imaging date and time of the captured image of the inspection target registered in the database; and
a comparison and evaluation item with maintenance inspection information that corresponds to a comparison and evaluation for a temporal order between an imaging date and time of the captured image and a date and time of a maintenance inspection information of a relevant information regarding the captured image of the inspection target registered in the database.

* * * * *